(12) United States Patent
Wager et al.

(10) Patent No.: US 9,992,009 B2
(45) Date of Patent: Jun. 5, 2018

(54) METHOD AND APPARATUS FOR PERFORMING UPLINK TRANSMISSIONS IN A WIRELESS COMMUNICATIONS SYSTEM

(75) Inventors: Stefan Wager, Espoo (FI); Mats Sågfors, Kyrkslätt (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 13/266,106

(22) PCT Filed: Jan. 25, 2010

(86) PCT No.: PCT/SE2010/050064
§ 371 (c)(1),
(2), (4) Date: Oct. 24, 2011

(87) PCT Pub. No.: WO2010/123430
PCT Pub. Date: Oct. 28, 2010

(65) Prior Publication Data
US 2012/0044897 A1    Feb. 23, 2012

Related U.S. Application Data

(60) Provisional application No. 61/172,322, filed on Apr. 24, 2009.

(51) Int. Cl.
*H04W 72/04* (2009.01)
*H04L 5/00* (2006.01)
(Continued)

(52) U.S. Cl.
CPC .......... *H04L 5/0091* (2013.01); *H04L 1/0039* (2013.01); *H04L 5/0037* (2013.01);
(Continued)

(58) Field of Classification Search
USPC ............... 370/230, 235, 252, 328, 329, 431
See application file for complete search history.

(56) References Cited

U.S. PATENT DOCUMENTS 9,100,161 B2    8/2015  Wager et al.
2006/0146833 A1 *  7/2006  Roberts ................ H04W 99/00
                                    370/395.42
(Continued)

FOREIGN PATENT DOCUMENTS

EP    1901491 A1    3/2008
WO    2007101510 A1    9/2007
(Continued)

OTHER PUBLICATIONS

NOKIA. Discussion of short format DL allocation within UL Grant. 3GPP TSG-RAN WG1 Meeting #50. Tdoc R1-073650. Athens, Greece, Aug. 20-24, 2007.
Author Unknown, "Technical Specification Group Radio Access Network; Evolved Universal Terrestrial Radio Access (E-UTRA); Physical layer procedures (Release 8)," Technical Specification 36.213, Version 8.6.0, 3GPP Organizational Partners, Mar. 2009, 77 pages.
(Continued)

*Primary Examiner* — Yemane Mesfin
*Assistant Examiner* — Mon Cheri Davenport
(74) *Attorney, Agent, or Firm* — Sage Patent Group

(57) ABSTRACT

The present invention relates to methods and apparatus for performing uplink transmission in a wireless communications system. A mobile terminal is provided with a set of available transport formats by receiving at least one UL grant comprising a transport format indication pointing to one or more transport formats. The mobile terminal then selects a suitable transport format from the set, for example in dependence on propagation channel conditions, for transmission of a scheduled transmission.

22 Claims, 19 Drawing Sheets

| MCS Index 605 | Modulation Order Index 610a | TBS Index 615a | Redundancy Version Index 620a | Modulation Order Index 610b | TBS Index 615b |
|---|---|---|---|---|---|
| 0 | 2 | 0 | 0 | 2 | 8 |
| 1 | 2 | 1 | 0 | 2 | 9 |
| 2 | 2 | 2 | 0 | 2 | 10 |
| 3 | 2 | 3 | 0 | 4 | 10 |
| 4 | 2 | 4 | 0 | 4 | 11 |
| 5 | 2 | 5 | 0 | 4 | 12 |
| 6 | 2 | 6 | 0 | 4 | 13 |
| 7 | 2 | 7 | 0 | 4 | 14 |
| 8 | 2 | 8 | 0 | 4 | 15 |
| 9 | 2 | 9 | 0 | 4 | 16 |
| 10 | 2 | 10 | 0 | 4 | 17 |
| 11 | 4 | 10 | 0 | 4 | 18 |
| 12 | 4 | 11 | 0 | 4 | 19 |
| 13 | 4 | 12 | 0 | 6 | 19 |
| 14 | 4 | 13 | 0 | 6 | 20 |
| 15 | 4 | 14 | 0 | 6 | 21 |

650

(51) Int. Cl.
　　　*H04L 1/00*　　　(2006.01)
　　　*H04L 1/18*　　　(2006.01)
　　　*H04W 72/14*　　(2009.01)

(52) U.S. Cl.
　　　CPC .......... *H04L 1/0003* (2013.01); *H04L 1/0007* (2013.01); *H04L 1/0009* (2013.01); *H04L 1/1819* (2013.01); *H04W 72/14* (2013.01)

(56) References Cited

U.S. PATENT DOCUMENTS

| 2006/0221892 | A1  | 10/2006 | Usuda et al. | |
|---|---|---|---|---|
| 2007/0165595 | A1* | 7/2007  | Xu et al. | 370/350 |
| 2007/0297360 | A1  | 12/2007 | Joachim et al. | |
| 2008/0159324 | A1* | 7/2008  | Bosch et al. | 370/432 |
| 2008/0225782 | A1  | 9/2008  | Wang et al. | |
| 2009/0059929 | A1* | 3/2009  | Lee | 370/395.4 |
| 2010/0074178 | A1* | 3/2010  | Larmo et al. | 370/328 |
| 2011/0002290 | A1* | 1/2011  | Kim et al. | 370/329 |
| 2011/0032889 | A1* | 2/2011  | Lee | H04W 74/006 370/329 |
| 2011/0170503 | A1* | 7/2011  | Chun et al. | 370/329 |

FOREIGN PATENT DOCUMENTS

| WO | 2008131902 | A1 | 11/2008 |
|---|---|---|---|
| WO | 2009045139 | A1 | 4/2009 |
| WO | 2009088345 | A2 | 7/2009 |
| WO | 2009158545 | A2 | 12/2009 |

OTHER PUBLICATIONS

Author Unknown, "Technical Specification Group Radio Access Network; Evolved Universal Terrestrial Radio Access (E-UTRA) Medium Access Control (MAC) protocol specification (Release 8)," Technical Specification 36.321, Version 8.5.0, 3GPP Organizational Partners, Mar. 2009, 46 pages.

Author Unknown, "Technical Specification Group Radio Access Network; Evolved Universal Terrestrial Radio Access (E-UTRA) Radio Resource Control (RRC); Protocol specification (Release 8)," Technical Specification 36.331, Version 8.5.0, 3GPP Organizational Partners, Mar. 2009, 204 pages.

Author Unknown, "Technical Specification Group Radio Access Network; Evolved Universal Terrestrial Radio Access (E-UTRA) Radio Resource Control (RRC); Protocol specification (Release 8)," Technical Specification 36.331, Version 8.8.0, 3GPP Organizational Partners, Dec. 2009, 211 pages.

Ericsson, "R2-092080: LTE Advanced Latency Performance," 3rd Generation Partnership Project (3GPP), TSG-RAN WG2 #65bis, Mar. 23-27, 2009, 9 pages, Seoul, Korea.

International Search Report and Written Opinion for International Patent Application No. PCT/SE2010/050064, dated Jul. 28, 2010, 5 pages.

International Preliminary Report on Patentability for International Patent Application No. PCT/SE2010/050064, dated Nov. 3, 2011, 7 pages.

Extended European Search Report for European Patent Application No. 10767377.4, dated Apr. 12, 2017, 18 pages.

* cited by examiner

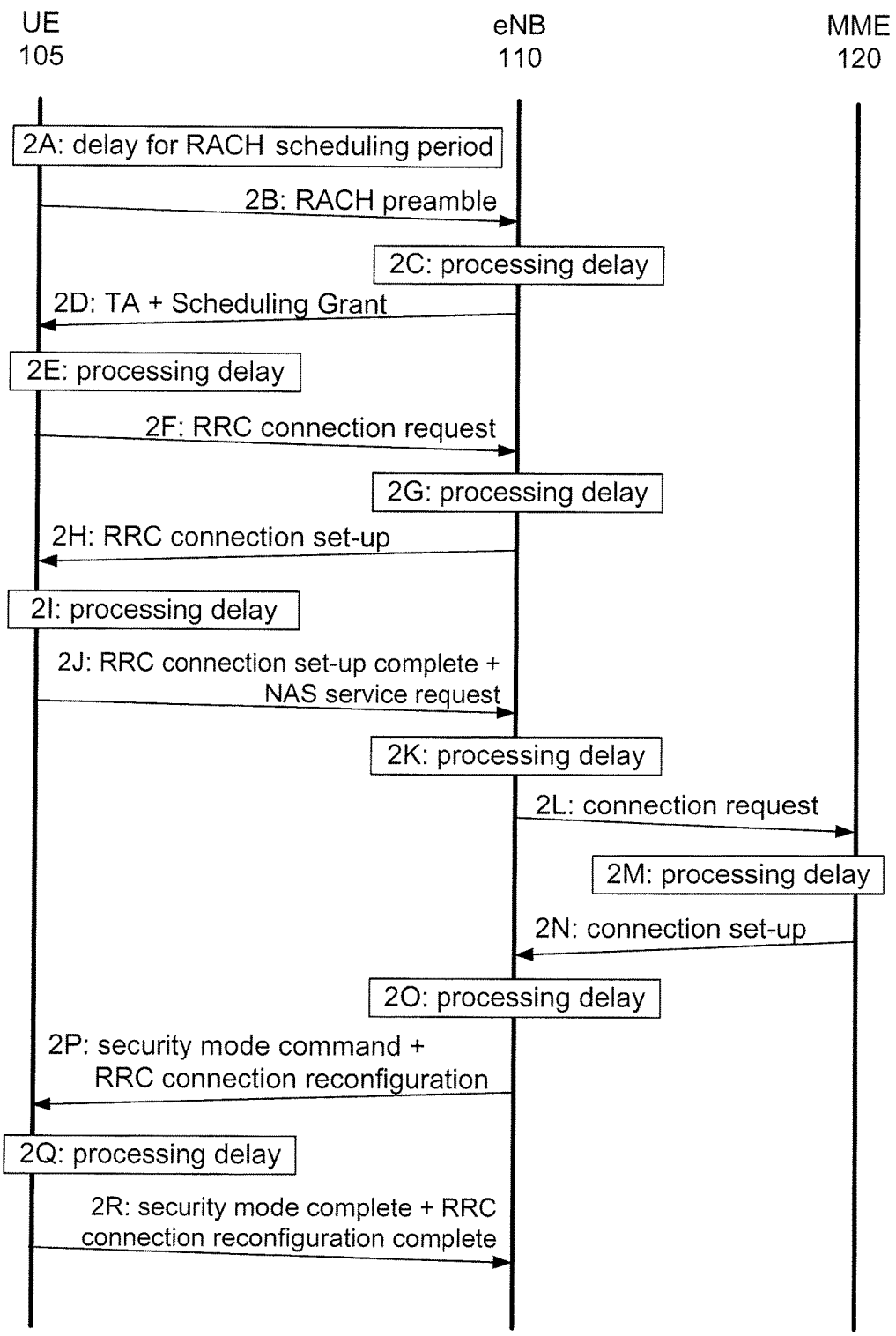

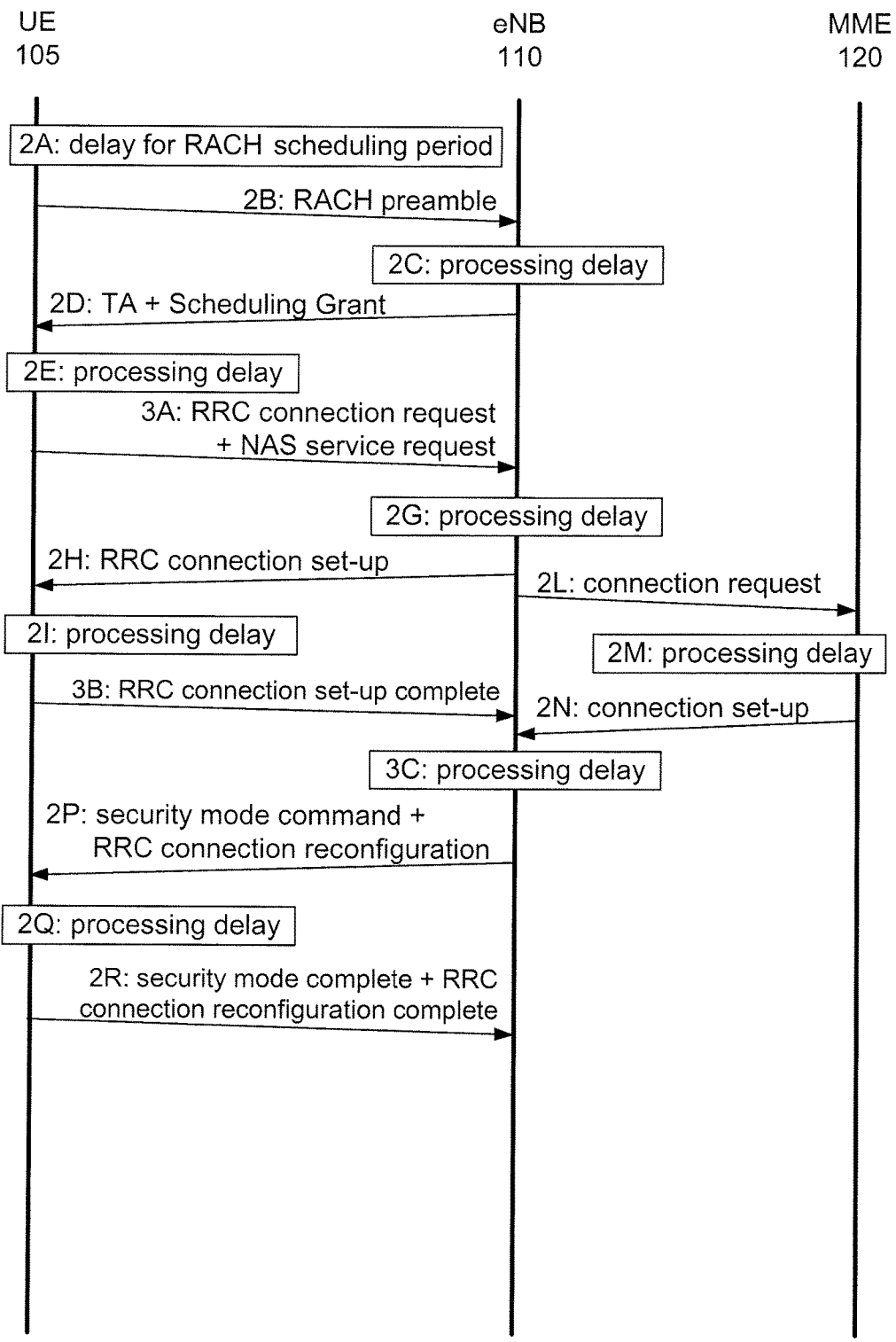

Fig. 6a

| MCS Index 605 | Modulation Order Index 610 | TBS Index 615 | Redundancy Version Index 620 |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | reserved | | 2 |
| 31 | reserved | | 3 |

| MCS Index 605 | Modulation Order Index 610a | TBS Index 615a | Redundancy Version Index 620a | Modulation Order Index 610b | TBS Index 615b |
|---|---|---|---|---|---|
| 0 | 2 | 0 | 0 | 2 | 8 |
| 1 | 2 | 1 | 0 | 2 | 9 |
| 2 | 2 | 2 | 0 | 2 | 10 |
| 3 | 2 | 3 | 0 | 4 | 10 |
| 4 | 2 | 4 | 0 | 4 | 11 |
| 5 | 2 | 5 | 0 | 4 | 12 |
| 6 | 2 | 6 | 0 | 4 | 13 |
| 7 | 2 | 7 | 0 | 4 | 14 |
| 8 | 2 | 8 | 0 | 4 | 15 |
| 9 | 2 | 9 | 0 | 4 | 16 |
| 10 | 2 | 10 | 0 | 4 | 17 |
| 11 | 4 | 10 | 0 | 4 | 18 |
| 12 | 4 | 11 | 0 | 4 | 19 |
| 13 | 4 | 12 | 0 | 6 | 19 |
| 14 | 4 | 13 | 0 | 6 | 20 |
| 15 | 4 | 14 | 0 | 6 | 21 |

650

METHOD AND APPARATUS FOR PERFORMING UPLINK TRANSMISSIONS IN A WIRELESS COMMUNICATIONS SYSTEM

This application claims the benefit of U.S. Provisional Application No. 61/172,322, filed Apr. 24, 2009, the disclosure of which is fully incorporated herein by reference.

TECHNICAL FIELD

The invention relates to the field of wireless communication, and in particular to uplink transmissions in a wireless communications system.

BACKGROUND

In Long-Term Evolution (LTE) wireless communication systems as currently specified by the $3^{rd}$-Generation Partnership Project (3GPP), mobile terminals ("UEs", in 3GPP parlance) can be in idle or connected mode. In idle mode, a UE has no connection to the base station ("evolved Node B", or "eNB", in 3GPP parlance). UEs in idle state thus have no possibility for user data transmission. Since UEs in idle mode consume less network resources tha UEs in connected mode, the network will switch UEs to idle state after a certain time of inactivity. Consequently, a fast transition from the idle mode to connected mode is a vital component of the system latency. In LTE standardisation, a target has been set up to reduce the random access set up time to less than 50 milliseconds.

The possibility to send the so called Non Access Stratum (NAS) Service Request together with the Radio Resource Control (RCR) Connection Request has been discussed at standardization meetings related to Release 8 of the 3GPP standards (see 3GPP R2-092080, "LTE Advanced Latency Performance"). By transmitting the NAS Service Request together with the RRC Connection Request, an eNB 110 could forward the NAS Service Request to the core network in an S1 connection setup at an earlier point in time, e.g. in parallel with the RRC Connection Setup, thereby reducing the overall time required for the transition procedure of a UE 105 from idle mode to connected mode.

SUMMARY

A problem to which the present invention relates is the problem of how to provide fast transition from idle mode to connected mode of mobile terminals in a wireless communications system in a resource efficient manner.

This problem is addressed by allowing for a mobile terminal to select, from a set of available transport formats, a suitable transport format for transmission. Hereby can a suitable transport format be used for UL transmissions also in scenarios where the base station is unaware of the channel propagation conditions and/or the buffer status of the mobile terminal, such as for example upon transition of a mobile station from idle mode to connected mode. Hence, the transmission resources can be more efficiently utilized.

One embodiment provides a method of performing uplink transmission in a wireless communications system wherein base stations are arranged to grant uplink resources to mobile terminals. The method comprises: Receiving, in a mobile terminal, a UL grant comprising a transport format indication; identifying, in the mobile terminal, a set of available transport formats by identifying the transport format indication in an extended transport format table wherein a transport format indication is associated with at least two different transport formats, the at least two different transport formats associated with the received transport format indication forming the set of available transport formats; selecting, in the mobile terminal, a transport format from the set of available transport formats; and transmitting, from the mobile terminal, a scheduled transmission using the selected transport format.

This embodiment also provides for a method performed in a base station for facilitating for uplink transmissions by a mobile terminal. The method comprises: Identifying, in the base station, a transport format set comprising transport formats to be available for a scheduled transmission from a mobile terminal by use of an extended transport format table, wherein a transport format indication is associated with a set of transport formats; and transmitting, from the base station, a UL grant comprising the transport format indication to which the identified set of transport formats is associated in the extended transport format table. The method further comprises receiving, in the base station, a scheduled transmission in response to the UL grant; and decoding the scheduled transmission by blind detection using transport formats from the identified set of transport formats.

By this embodiment is achieved that no changes to the present standard of UL grant transmission are necessitated by the present technology, while providing the mobile terminal with a selection of transport formats to choose from and facilitating for resource efficient and speedy uplink scheduling.

Another embodiment provides a method which comprises: Receiving, in a mobile terminal, a UL grant comprising a first transport format indication (512); and identifying, in the mobile terminal, a set of available transport formats by identifying a first transport format to which the transport format indication points; determining at least one further transport format indication by use of the first transport format indication; and identifying at least one further transport format(s) as a transport format to which the further transport format indication(s) points, said first transport format and at least one further transport format forming the set of available transport formats. The method further comprises: selecting, in the mobile terminal, a transport format from the set of available transport formats for a scheduled transmission; and transmitting, from the mobile terminal, the scheduled transmission using the selected transport format.

This embodiment also provides for a method performed in a base station for facilitating for uplink transmissions by a mobile terminal. This method comprises: identifying, in the base station, a transport format set comprising transport formats to be available for a scheduled transmission from a mobile terminal, where the identification includes: identifying a first transport format indication pointing to a first transport format; deriving at least one further transport format indication from the first transport format indication, a further transport format indication pointing to a further transport format; and identifying the set of transport formats as the transport formats to which the first and further transport format indications point. The method further comprises: transmitting, from the base station, a UL grant comprising the first transport format indication; receiving, in the base station, a scheduled transmission in response to the UL grant; and decoding the scheduled transmission by blind detection using transport formats from the identified set of transport formats.

Also by this embodiment is achieved that no changes to the present standard of UL grant transmission are necessitated by the present technology, while providing the mobile terminal with a selection of transport formats to choose from and facilitating for resource efficient and speedy uplink scheduling.

A yet further embodiment provides a method comprising: Receiving a first UL grant comprising a first transport format indication, the first UL grant being scheduled on a first RNTI; and receiving at least one further UL grant, a further UL grant comprising a further transport format indication, the further UL grant(s) being scheduled on different further RNTI(s). In this method, a set of available transport formats for a scheduled transmission is identified by: Identifying a first transport format using the transport format indication in the first UL grant; identifying further transport format(s) using the transport format indication in the further UL grant(s); wherein the first and further transport formats form the set of available transport formats. The method further comprises: selecting, in the mobile terminal, a transport format from the set of available transport formats for a scheduled transmission; and transmitting, from the mobile terminal, the scheduled transmission using the selected transport format.

This embodiment also provides a method of facilitating for uplink transmission from a mobile terminal in a wireless communications system wherein base stations are arranged to grant uplink resources to mobile terminals. The method comprises: Identifying, in the base station, a transport format set comprising transport formats to be available for a scheduled transmission from a mobile terminal; identifying, in the base station, a set of different RNTIs; and transmitting, from the base station on different RNTIs, at least two UL grants, the different UL grants comprising different transport format indications pointing to different transport formats in the set of transport formats. The method further comprises receiving, in the base station, a scheduled transmission in response to the transmission of the UL grants; and decoding the scheduled transmission by use of transport format(s) of the set of transport formats.

By this embodiment is achieved that no changes to the present standard of transmission of a UL grant, nor to the interpretation of a UL grant, are necessitated by the present technology, while providing the mobile terminal with a selection of transport formats to choose from and facilitating for resource efficient and speedy uplink scheduling.

In this embodiment, the method performed in a base station and the method performed in the mobile terminal could comprise deriving a further RNTI as an RNTI for which a predetermined offset has been added to the first RNTI.

Generally, the selection of transport format can advantageously be performed in dependence on an estimate of the uplink propagation channel conditions, and/or in dependence on UE buffer status information. By performing the selection in dependence on an estimate of the uplink propagation channel conditions, the risk for using a too weak coding, whereby the transmission will be unsuccessful, is reduced. Furthermore, the risk for using an unnecessarily strong coding, thereby wasting transmission resources, can be reduced.

In an implementation wherein the mobile terminal is arranged to select a transport format upon receipt of a UL grant sent in response to a RACH preamble, a method performed in the mobile terminal may further comprise determining, in the mobile terminal, whether a core network service request is to be included in the scheduled transmission sent in response to the received UL grant. Hereby is achieved that the average set-up time in a wireless communications system may be significantly reduced in a resource efficient manner, since a core network service request will only be included in a scheduled transmission when a suitable transport format can be selected. In this implementation, a reduced amount of resources can often be used for transmission of a combined message, whereas in circumstances where the channel conditions are poor, the risk of transmitting an unsuccessful combined message is reduced.

In this implementation, the set of transport formats can be selected by the base station in a variety of ways. For example, the transport format having the strongest coding in the set could correspond to a coding which does not allow for the transmission of a combined radio connection and core network connection request message from the edge of a cell being served by the base station, but for the transmission of a separate radio connection request from said cell edge. By selecting the set of transport formats in this manner is achieved that a large part of the set-up procedures in the communications system will benefit from the combined transmission of the radio connection request and the core network service request, while the resource consumption of the connection set-up procedure is kept at a reasonable level.

The problem is further addressed by a mobile terminal supporting mobile-terminal-performed selection of a transport format for a scheduled transmission. The mobile terminal comprises transceiver for transmitting and receiving radio signals; a transport format set deriving mechanism connected to the transceiver, and a scheduled transmission generating mechanism connected to the transceiver and to the transport format set deriving mechanism. The scheduled transmission generating mechanism is programmably configured to select a transport format from a set of available transport formats in response to the transport format set deriving mechanism having identified a set; to generate the scheduled transmission according to the selected transport format; and to deliver the scheduled transmission to the transceiver for transmission.

In one embodiment of the mobile terminal, the a transport format set deriving mechanism is programmably configured to identify, in response to receipt of a UL grant (506) comprising a transport format indication, a set of transport formats available for a scheduled transmission, by: identifying the transport format to which the transport format indication points; determining at least one further transport format indication from the received transport format indication; and identifying at least one further transport format(s) as a transport format to which the further transport format indication(s) points, said transport format and at least one further transport format forming the set of available transport formats; and In a further embodiment of the mobile terminal, the transport format set deriving mechanism is programmably configured to identify, in response to receipt of a UL grant comprising a transport format indication, a set of transport formats available for a scheduled transmission, by: identifying the transport format to which the transport format indication points; determining at least one further transport format indication from the received transport format indication; and identifying at least one further transport format(s) as a transport format to which the further transport format indication(s) points, said transport format and at least one further transport format forming the set of available transport formats.

In a yet further embodiment of the mobile terminal, the transport format set deriving mechanism is programmably configured to identify, in response to receipt of at least two UL grants (506) having been scheduled on different RNTIs, a set of transport formats available for a scheduled transmission, by extracting a transport format indication from each of the at least two UL grants, where the transport format indication each point to a transport format and the set of available transport format is formed of the transport formats to which the extracted transport format indications point.

The problem is further addressed by a base station supporting mobile-terminal-performed selection of a transport format for a scheduled transmission. a transceiver for transmitting and receiving radio signals; a transport format set identification mechanism programmably configured to identify a transport format set including transport formats to be available for a scheduled transmission from a mobile terminal; a UL grant generator connected to the transport format identification mechanism and to the transceiver; and a decoder connected to the transceiver and to the transport format set identification mechanism.

In one embodiment of the base station, the transport format set identification mechanism is programmably configured to: identify a transport format set by use of an extended transport format table, wherein a transport format indication is associated with the identified set of transport formats, and send a signal comprising said transport format indication to a UL grant generator. The UL grant generator is programmably configured to, in response to receipt of a signal comprising a transport format indication: generate a UL grant (506) comprising the received transport format indication; and forward the UL grant to the transceiver for transmission. The decoder is programmably configured to decode a received scheduled transmission by blind detection using transport formats from a transport format set identified for the scheduled transmission.

In another embodiment of the base station the transport format set identification mechanism is programmably configured to: identify a transport format set including transport formats to be available for a scheduled transmission from a mobile terminal, the identification including: identifying a first transport format indication pointing to a first transport format; deriving at least one further transport format indication from the first transport format indication, a further transport format indication pointing to a further transport format; and identifying the transport format set as the transport formats to which the first and further transport format indications point; and send a signal comprising one of said transport format indications to a UL grant generator. The UL grant generator is programmably configured to, in response to receipt of a signal comprising a transport format indication: generate a UL grant comprising the received transport format indication; and forward the UL grant to the transceiver for transmission. The decoder is programmably configured to decode a received scheduled transmission by blind detection using transport formats from a transport format set identified for the scheduled transmission.

In a yet further embodiment of the base station, the transport format set identification mechanism is programmably configured to: identify a transport format set including transport formats to be available for a scheduled transmission from a mobile terminal, wherein each transport format is associated with a transport format indication; and send, to the UL grant generator, a signal indicative of the transport format indications of the transport formats in the set. The UL grant generator is programmably configured to, in response to receipt of a signal comprising a set of different transport format indications: generate a set of UL grants, each UL grant being indicative of a different received transport format indication and generated on a different RNTI; and forward the UL grants to the transceiver for transmission. The decoder is programmably configured to decode a received scheduled transmission by use of the transport formats of a transport format set identified for the scheduled transmission.

The invention further relates to a wireless communications system comprising at least one base station according to the one the embodiments defined above; to a computer program for performing uplink transmissions in a mobile terminal which supports transport format selection in the mobile terminal; and to a computer program for executing in a base station which supports transport format selection in the mobile terminal.

Further aspects of the invention are set out in the following detailed description and in the accompanying claims.

BRIEF DESCRIPTION OF THE DRAWINGS

FIG. 2 is a signalling diagram illustrating a set-up signalling procedure in accordance with the present standard.

FIG. 3 is a signalling diagram illustrating an alternative set-up signalling procedure.

FIG. 4b is a flowchart schematically illustrating an embodiment of the method illustrated in FIG. 4a.

FIG. 6a illustrates a transport format table wherein a transport format indication in the form of an MCS index is associated with a transport format.

FIG. 6b illustrates a transport format table wherein a transport format indication in the form of an MCS index is associated with two different transport formats.

FIG. 8b is a flowchart illustration an application of the method illustrated in FIG. 8a.

FIGS. 9a-c are flowcharts schematically illustrating three different embodiments of the method shown in FIG. 8a.

DETAILED DESCRIPTION

Figure 1:
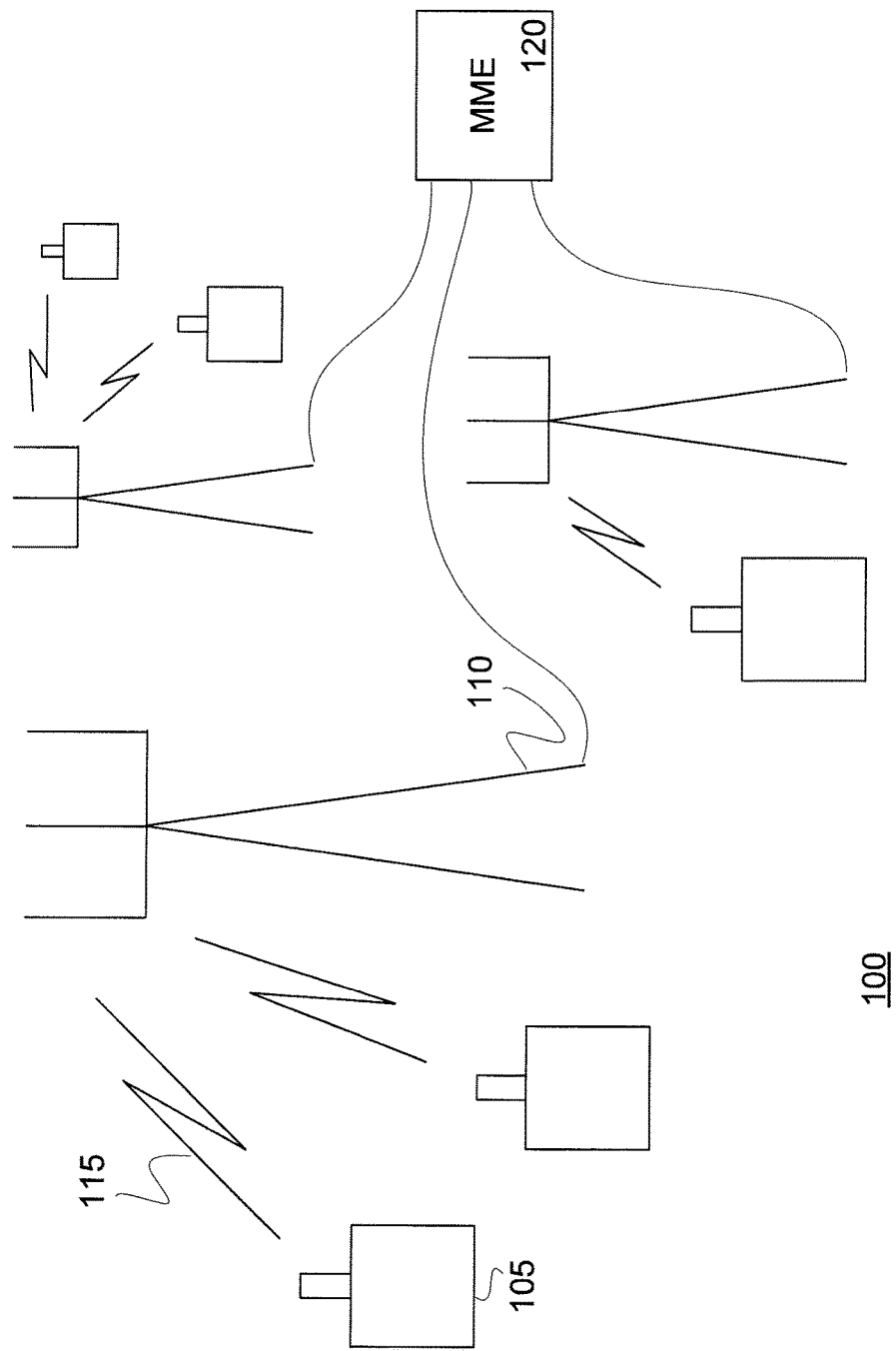
FIG. 1 is a schematic illustration of a wireless communications system operating according to the LTE standard.

A wireless communications system 100 operating according to the LTE standard is schematically illustrated in FIG. 1. The communications system 100 of FIG. 1 comprises a plurality of user equipments (UE) 105 and a plurality of eNBs 110. A UE 105 may communicate wirelessly with an eNB 110 via a radio interface 115. User data, as well as control plane signalling, may be communicated between a UE 105 and an eNB 110 over the radio interface 115. Communication system 100 of FIG. 1 further comprises a mobility manager entity (MME) 120, to which the eNBs 110 of FIG. 1 are connected. Typically, a communications system 100 comprises a plurality of MMEs 120, each serving a group of eNBs 110, as well as further nodes (not shown).

As mentioned above, a UE 105 in idle mode has no possibility for user data transmission. The transition from idle mode to connected mode involves the establishment of a Radio Resource Control (RRC) connection between the UE 105 and an eNB 110. The transition further involves security activation, and the establishment of a set of default radio bearers to enable data traffic. The currently specified control plane set-up signalling sequence used for the transition from idle mode to connected mode when initiated by the UE 105 is shown in FIG. 2 (see e.g. 3GPP TS 36.331 v.8.5.0 or 3GPP TS 36.300 v. 8.8.0). The set-up signalling procedure is initiated by the UE 105 transmitting a Random Access Channel (RACH) preamble 2B in one of the Physical Random Access Channel (PRACH) resources. The transmission of the RACH preamble 2B is often preceded by a delay 2A, originating from the UE 105 awaiting a RACH scheduling period on which the RACH preamble 2B may be transmitted. Upon receipt of the RACH preamble 2B, a processing delay 2C occurs in the eNB 110, before the eNB 110 responds with a Medium Access Control (MAC) Random Access Response (RAR) message 2D, which is transmitted to the UE 105. The MAC RAR message 2D includes uplink Time Alignment (TA) information and a Serving Grant (SG), also referred to as a scheduling grant or a UL grant. The SG is used to assign uplink transmission resources for a scheduled message (message 2F). The TA is used to adjust the uplink transmission timing so that the UE gains uplink synchronization. Upon receipt of the MAC RAR message 2D, a processing delay 2E occurs in the UE 105. The UE 105 proceeds by transmitting a radio connection request in the form of an RRC Connection Request message 2F to the eNB 110, using the coding & modulation and uplink resources signalled in the SG of MAC RAR message 2D. Upon receipt of the RRC Connection Request message 2F, a processing delay 2G occurs in the eNB 110. The eNB 110 responds by sending an RRC Connection Setup message 2H to the UE 105. The RRC connection message 2H sets up an RRC connection and moves the UE 105 to RRC connected state. Upon receipt of the RRC Connection Set-up message 2H, a processing delay 2I occurs in the UE 105. The UE 105 proceeds by sending a message 2J including a core network service request: RRC Connection Setup Complete+Non Access Stratum (NAS) Service Request message 2J to the eNB 110, confirming the RRC connection set-up and requesting the setup of NAS services and the default bearers for the user plane. The NAS is a functional layer running between the UE 105 and the core network, which is transparent to the eNB 110. The NAS supports traffic and signalling messages between the UE 105 and the Core Network, of which the MME 120 forms a part. Upon receipt of the RRC Connection Setup Complete+NAS Service Request message 2J, a processing delay 2K occurs in the eNB 110. The eNB 110 forwards the NAS service request to the MME 120 in a connection request message 2L. A processing delay 2M occurs in the MME 120 upon receipt of the connection request message 2L. The MME 120 sets up an S1 connection between the eNB 110 and the core network and sends a connection set-up message 2N to the eNB 110. The eNB 110 then performs Security Mode Command to setup integrity protection and ciphering over the radio interface, see messages 2P and 2R, with corresponding processing delays 2O and 2P in the eNB 110 and UE 105, respectively. At the same time, the RRC connection is reconfigured to establish the default bearers.

The procedure shown in FIG. 2 describes the transition from idle mode to connected mode when initiated by the UE 105. For a network-initiated random access attempt, the sequence illustrated in FIG. 2 is typically preceded by a paging message from the network (via the eNB 110) to the UE 105.

As can be seen in FIG. 2, each message transmitted between the nodes 105, 110 and 120 introduces a processing delay in the nodes involved in the message transmission. One way to reduce the control plane setup delay, and thus to speed up the transition from idle mode to connected mode, is to reduce the number of handshakes. The possibility to send the NAS Service Request together with the RRC Connection Request of message 2F has been previously discussed in standardization meetings related to Release 8 of the 3GPP standards (see 3GPP R2-092080, "LTE Advanced Latency Performance"). By transmitting the NAS Service Request together with the RRC Connection Request of message 2F, the eNB 110 could forward the NAS connection request 2L over S1 to the MME 120 at an earlier point in time, thereby reducing the overall time required for the transition procedure of a UE 105 from idle mode to connected mode. The RRC Connection Setup 2H could then be transmitted in parallel with the S1 Connection request message 2L. A UE initiated transition procedure from idle to connected mode, wherein the NAS service request is transmitted together with the RRC connection request of message 2F, is illustrated by the signalling diagram of FIG. 3.

In the signalling diagram of FIG. 3, most of the signalled messages are the same as in FIG. 2. However, the RRC Connection Request message 2F has been replaced by an RRC Connection Request+NAS Service Request message 3A, wherein a request for an RRC connection and a request for NAS services are combined. Therefore, the connection request 2L from the eNB 110 to the MME 120, and the connection set-up message 2N transmitted from the MME 120 to the eNB 110, can be transmitted at an earlier point in time, i.e. upon receipt of the combined RRC Connection Request+NAS Service Request message 3A in the eNB 110. Furthermore, the processing delay 2M in the MME 120 can occur in parallel to any processing delays occurring in the set up of radio resources, thus reducing the total delay involved in the set-up procedure. In the following, the term scheduled transmission will be used to refer to data transmitted on resources allocated in a scheduling grant (cf. message 2D), such as for example message 2F or 3A. In a random access procedure, such a scheduled transmission is sometimes referred to as msg3, see e.g. 3GPP TS 36.321 v. 8.5.0.

In the procedure illustrated in FIG. 3, the RRC Connection Set-up Complete+NAS Service Request message 2J of FIG. 2 has been replaced by an RRC Connection Set-up Complete message 3B, since the NAS service request has already been sent in the combined message 3A. When the RRC Connection Set-up Complete message 3B and the Connection Set-up message 2N from the MME 120 have been received by the eNB 110, the eNB 110 transmits the security mode command+RRC Connection Reconfiguration message 2P to the UE 105, after a processing delay 3C.

As can be seen in FIG. 3, the speed of transition from idle mode to connected mode for a UE 105 can be increased by combining the RRC connection request and the NAS service request in a combined message 3A.

However, in a communications system 100 operating according to the LTE standard, all uplink transmissions are scheduled by the eNB 110. The eNB 110 also performs the uplink link adaptation and selects a transport format, including a coding and modulation scheme, to be used by the UE 105. In order to make an accurate decision on coding and modulation scheme, the eNB 110 should advantageously have access to information on propagation channel conditions, e.g., the channel path loss, as well as information on the status of the buffer(s) in the UE 105 wherein data to be transmitted by the UE 105 is buffered before transmission.

At the time when the eNB 110 schedules the combined message 3A in the procedure illustrated by FIG. 3, the eNB 110 has no knowledge of the UE buffer status, nor of the propagation channel conditions. Absent such information, in order to avoid situations where the transmission of a combined message 3A would not be successful, the eNB 110 would have to schedule the UE 105 in a manner so that the transmission of the larger entity of data (for example the combined RRC Connection Request+NAS Service Request message 3A) could be transmitted even from the cell edge.

Hence, this unawareness of both the needs and possibilities of the UE 105 to transmit a larger entity of data from the UE 105 to the eNB 110 means, in practice, that the eNB 110 would have to schedule the UE 105 in a conservative manner. In other words, the eNB 110 would have to assume that the UE 105 may be on the cell edge, and therefore assign a scheduling grant to the UE 105 with a Modulation and Coding Scheme (MCS) that is strong, in the sense that the MCS assignment includes sufficient coding to ensure successful reception in the worst circumstances, e.g., harsh radio conditions or strong signal attenuation. Such assignments mean that all UEs 105, making initial access attempts in a cell, will receive MCS assignments suitable for cell-edge conditions for the transmission of a combined message 3A, even if some UEs 105 are close to the receiver (i.e. close to the eNB 110) so that a weaker coding would have been sufficient. By selecting a strong coding, more redundant bits will be signalled from the UE 105, and less useful information will be put through the uplink 115. Such conservative scheduling of all UEs 105 in the set-up procedure thus leads to inefficiency, since the varying link conditions of different UEs 105 are not utilized in selecting the best MCS and transport format for a UE 105.

However, the present technology provides the possibility for the eNB 110 to provide a UE 105 with a set of available transport formats from which a transport format to be used for a scheduled transmission may be selected, wherein a set comprises at least two transport formats. The UE 105 may, in the present technology, be given some freedom to select an uplink modulation order and TBS for the scheduled transmission from the set of available transport formats. The UE 105 may efficiently select a suitable transport format, since the UE 105 typically has, or can obtain, knowledge of parameters upon which the transport format decision may advantageously be based, such as propagation channel conditions and/or UE buffer status.

The UE 105 may then, in a random access procedure, choose whether to send the RRC Connection request and the NAS service request in a combined message 3A, or whether to send the RRC connection requests and the NAS service request separately (to send separately is here construed as "to send in different scheduled transmissions"). This choice could advantageously depend on whether or not the combined message 3A would fit into the scheduled transmission when using the selected transport format. Since the UE 105 is provided with the possibility of adjusting the transport format to prevailing circumstances, and of choosing whether or not to send a large or small entity of data in the scheduled transmission, a less conservative transport format can often be used. If a less conservative transport format is used, the transmission resources of communications system 100 will be more efficiently utilised.

Sending the RRC Connection request and the NAS service request at the same time may not be the best solution in all situations, e.g. when the UE 105 is located at the cell edge. By providing the UE 105 with the possibility of choosing whether to send a combined message 3A or separate messages 2F & 2J, the transmission success of RRC connection requests and NAS service requests can be maintained at a high level while keeping resource utilization at a low level. If the transmission circumstances do not allow that a combined message 3A is transmitted on the scheduled transmission, the RRC connection request and the NAS service request are simply sent in separate scheduled transmissions. Although in such individual cases of poor channel conditions it might be that the set-up time is not reduced as compared to the present standard illustrated by FIG. 2, the average set-up time in communications system 100 will be greatly reduced.

In some embodiments, a UE 105 is provided with a capability of and process for selecting a transport format from a set of available transport formats derived from at least one received UL grant comprising a transport format indication (TFI) pointing to a transport format.

Based on the selection mechanism, the UE 105 can further be provided with the capability of determining whether to combine the aforementioned NAS and RRC requests, or whether to send the requests separately.

The transport format of the set that represents the strongest coding could for example be a transport format which is suitable for transmission of the separate RRC connection request message 2F from the cell edge on the allocated resource blocks. In this case, the further transport formats of the set could advantageously provide a weaker coding.

A UE 105 can estimate the propagation channel conditions, for example by measuring and/or estimating the uplink (UL) path loss. This could for example be done by measuring the downlink path loss, and then estimating the uplink path loss to be either the same as the downlink path loss, or derivable from a known relationship between the uplink path loss and the downlink path loss. Downlink path loss could in an LTE system 100 be based for example on measurements of the received signal power, such as the filtered Reference Signal Received Power (RSRP) measurements performed by a UE 105 (see e.g. 3GPP TS 36.331 v. 8.5.0) in combination with information on the reference signal power received from the eNB 110. Based on the estimation of the propagation channel conditions, the UE 105 could decide which transport format should be used. A transport format is typically defined by a modulation and coding scheme to be used, and could further be defined by a transport block size, an antenna mapping, etc. Given a particular modulation and coding scheme, the UE 105 can, in a random access scenario, determine whether a combined message 3A will fit into the allocated resource blocks. Although measurements of the downlink path loss may not always provide a highly accurate estimate of the uplink path loss, the accuracy will be sufficient for the purpose of selecting whether to send a combined message 3A or a separate RRC connection request message 2F.

The UE 105 may make a decision in a random access procedure as to whether the RRC Connection Request should be sent together with the NAS Service Request in a combined message 3A, or whether the requests should be sent at different times, for example in messages 2F and 2J as shown in FIG. 2.

Thus, in some embodiments is provided a mechanism for the UE 105 to make a selection of whether to send the two initial RRC and NAS service requests together, or separately.

The UE's transmission needs are known to the UE 105 and not to the eNB 110 when the UE 105 is in the idle state, since the uplink transmission buffer resides in the UE 105. Hence, the UE 105 is in a better position to determine the size of the entity of data which it would be desirable to transmit from the UE 105. This size would typically correspond to the amount of data waiting for transmission in the UE buffer. Based on the size of the entity of data residing in the UE buffer, and/or based on information on propagation channel conditions, the UE 105 can select a suitable transport format from a set of transport formats made available to the UE 105 by the eNB 110.

Figure 4A:
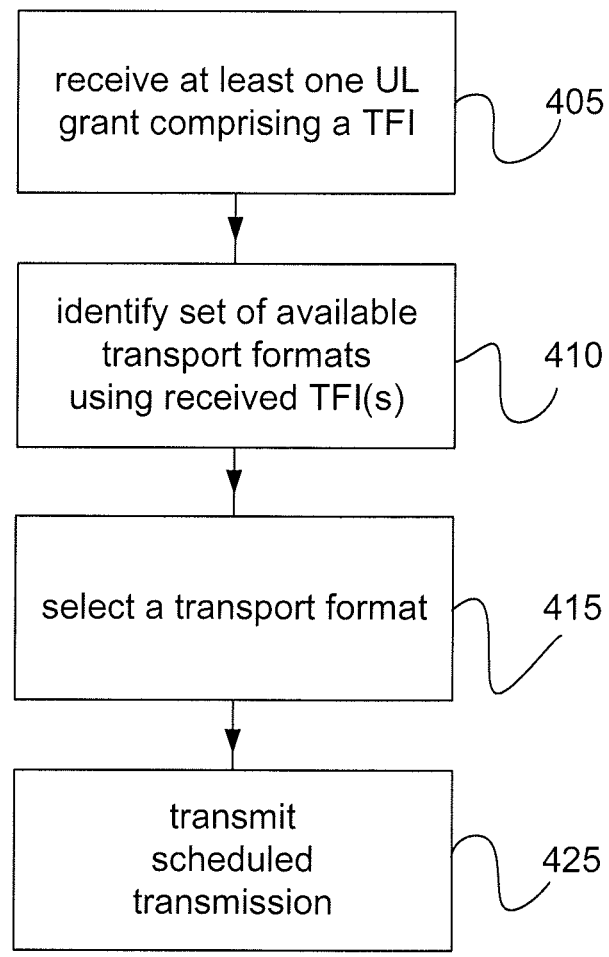
FIG. 4a is a flowchart schematically illustrating an embodiment of an uplink transmission procedure performed in a UE.

FIG. 4*a* is a flowchart schematically illustrating an example of an embodiment of an uplink transmission process that could be performed at a UE 105, for example in response to the UE 105 having transmitted a RACH preamble 2B to an eNB 110. At step 405, at least one UL grant is received by the UE 105 from the eNB 110, where the at least one UL grant comprises a TFI pointing to a transport format. By use of the received TFI(s), the UE 105 can identify a set of at least two available transport formats. In one embodiment of step 405, the UE 105 receives one UL grant which the UE 105 interprets as indicative of at least two transport formats, while in another embodiment of step 405, the UE 105 receives at least two UL grants, each indicative of a transport format which is available to the UE 105. In a yet further embodiment, the UE 105 receives more than one UL grant, of which the UE 105 interprets at least one to be indicative of at least two transport formats.

At step 410, the UE 105 identifies the set of available transport formats by using the TFI(s) received in the received UL grant(s) as indicated above. Step 410 will be further described in relation to FIGS. 7*a*-7*c*.

In step 415, the UE 105 selects, from the set of available transport formats, a transport format to be used for transmission of the scheduled transmission. The selection in step 415 can for example be based on a measure of the propagation channel conditions, e.g. in terms of estimated UL path loss, as discussed above: If the UL transmission path loss is high, a transport format of which the modulation and coding scheme is strong will typically be selected, whereas if the UL transmission path loss is low, a transport format of which the modulation and coding scheme is weak will typically be selected. The selection of step 415 could for example be performed based on a function, the outcome of which depends on the estimated value of the measure of the propagation channel conditions. One such function could be based on at least one threshold value of the propagation channel condition measure (e.g. downlink path loss), for example: "If downlink path loss is greater than a predetermined threshold value, then select the strongest available modulation and coding scheme" and "If downlink path loss is smaller than a predetermined threshold value, then select the weakest available modulation and coding scheme". When more than two transport formats are available, further threshold values and further intervals of the propagation channel condition measure could be applied. Furthermore, other functions or algorithms could be used in the selection of step 415.

The selection of a transport format could furthermore be based on the status of the UE buffer, either as an alternative to using a measure of the propagation channel condition as a parameter on which the selection is based, or in combination with using a measure of the propagation channel condition. The status of the UE buffer indicates the amount of data waiting in the UE buffer for transmission by the UE 105. The selection of a transport format could for example be based on one or more threshold values of the size of the data entity awaiting transmission in the UE buffer, for example "if the size of data entity in UE buffer exceeds a predetermined threshold value, then select the weakest available transport format" and "if size of data entity in UE buffer is smaller than a predetermined threshold value, then select the strongest available modulation and coding scheme". Other algorithms, the outcome of which depends on the size of the data entity in the UE buffer, may alternatively be contemplated.

If both a propagation channel condition measure and a measure of the size of the current data entity in the UE buffer are used as parameters in the selection process, the selection could for example be made so that the weakest transport format is only selected if the channel condition measure shows that the channel conditions are favourable (for example the downlink path loss is smaller than a predetermined channel condition threshold value) and the size of the present data entity in the UE buffer exceeds a predetermined buffer threshold value. The combination of a particular transport format and the resource block assignment will inform the UE 105 of how much data may be transmitted if the particular transport format is selected, and the predetermined buffer threshold value could for example depend on the resource block assignment. In LTE, the resource block assignment is typically conveyed to a UE 105 by means of resource block assignment indication referred to as the Fixed Size Resource Block Assignment. The selection of a transport format could for example be made in a two step process, so that the transport formats which would secure a successful transmission under the present propagation conditions are first identified, and then, the status of the UE buffer is considered in selecting a transport format from these identified transport formats. The strongest transport format which allows for transmission of the data entity which is desirable to transmit could for example be selected.

Other parameters could also be used as a basis for the selection of a transport format for transmission. For example, the available transmit power may be another factor in the selection of which transport format should be used.

Step 425 is then entered, wherein the scheduled transmission is sent to the eNB 110 on the resources scheduled in the UL grant, using the transport format selected in step 415.

Figure 4B:
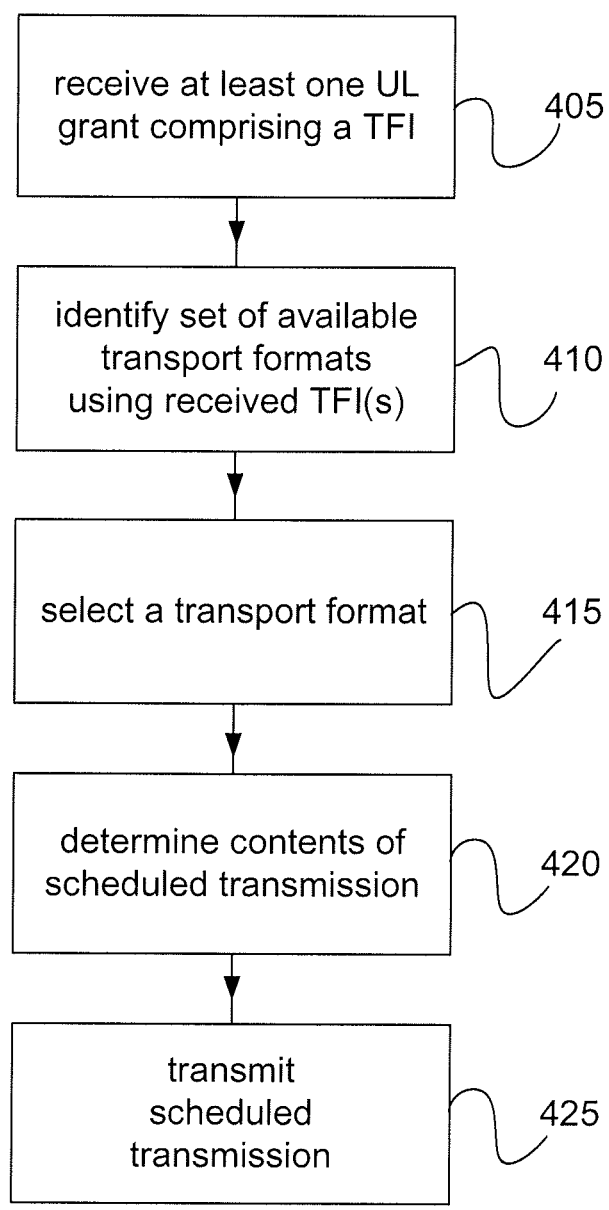

When the UE buffer status is considered in the transport format selection process of step 415, the data to be included in the scheduled transmission can be determined as a part of the transport format selection. However, if the transport format selection is performed independently of the UE buffer status, a separate step of determining the contents of the scheduled transmission could be included in the method of FIG. 4*a*, as is shown in FIG. 4*b*. In the method of FIG. 4*b*, step 420 is entered after the transport format selection step 415. In step 420, the contents to be included in the scheduled transmission are determined. In the UL grant(s) received in step 405, a Fixed Size Resource Block assignment has been given to the UE 105 by the eNB 110. The combination of the selected transport format and the assigned Fixed Size Resource Block Assignment will inform the UE 105 of how much data may be transmitted in the scheduled transmission. When the method of FIG. 4*b* is performed in response to the UE 105 having transmitted a RACH preamble 2B to an eNB 110, the UE 105 could advantageously choose the scheduled transmission to be a combined RRC connection request+NAS service request message 3A in step 420 if the selected transport format and Fixed Size Resource Block Assignment so allows. However, if the selected transport format and Fixed Size Resource Block Assignment only allows for the transmission of a smaller data entity, the UE 105 will determine in step 420 that the scheduled transmission will be an RRC connection request message 2F. Depending on the outcome of the selection process from the available transport formats (e.g. from available transport blocks and/or modulation & coding schemes), the UE 105 may decide to send the RRC connection request and the NAS service request separately in messages 2F and 2J, or to combine the requests in a combined message 3A sent in the same transport block.

The aforementioned transport format selection process can for example be implemented as a Media Access Control (MAC) layer process. A number of non-exclusive solutions for how to implement the interaction between such MAC process in the MAC layer and the higher RRC layer can be anticipated. In the random access scenario illustrated by FIG. 3, for example, the RRC layer may for instance create both a combined message 3A and separate messages 2F and 2J, which are all provided to the MAC layer, and, depending on the outcome of the transport format selection process above, the MAC layer of the UE 105 selects which of the messages to send. Alternatively, the UE 105 may first perform the transport format selection process in the MAC layer, and the MAC layer will then report the outcome to the RRC layer, which then creates the appropriate message/messages and submits the outcome to lower layers.

In some embodiments, a set of different Fixed Size Resource Block Assignments can also be made available to the UE 105 by means of one or more UL grant messages, for example in response to a RACH preamble 2B sent from the UE 105. From this set, the UE 105 would select a suitable Fixed Size Resource Block Assignment. An algorithm could for example be used by which a Fixed Size Resource Block Assignment corresponding to a larger amount of resource blocks is selected in case the larger entity of data can not fit into a smaller amount of resource blocks when using the selected transport format. The set of available Fixed Size Resource Block Assignments could be communicated to the UE 105 in a manner similar to that in which the set of available transport formats is communicated to the UE 105, and which will be further described in relation to FIGS. 7a-7c.

Figure 5A:
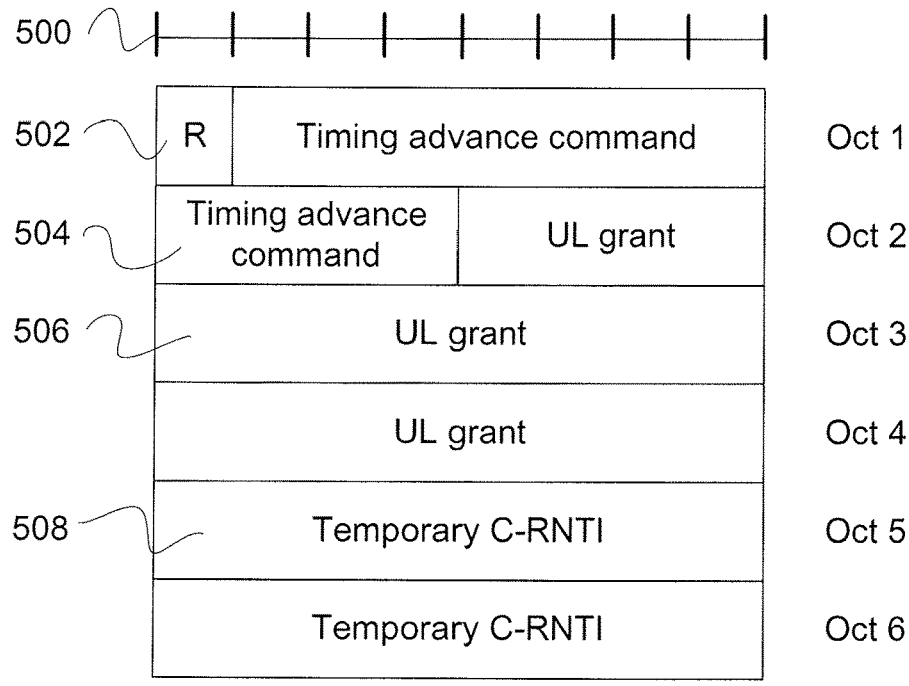
FIG. 5a illustrates a MAC RAR message according to the present standard.

According to the LTE standard, a UL grant transmitted to the UE 105 from the eNB 110 is, in the random access procedure, conveyed to the UE 105 in a MAC RAR message 2D. The present format of the MAC RAR message 2D as defined in release 8 of the LTE standard (see 3GPP TS 36.321 v. 8.5.0 section 6.1.5) is shown in FIG. 5a. The MAC RAR message 2D of FIG. 5a includes 6 octets, including a Reserved (R) field 502, a timing advance command field 504 comprising information on the timing advance to be used by the UE 105, a UL grant field 506 further defined below, and a temporary C-RNTI field 508, comprising information to the UE 105 of a temporary Cell Radio Network Temporary Identifier (C-RNTI) to be used by the UE 105. The axis 500 indicates the size of a bit.

Figure 5B:
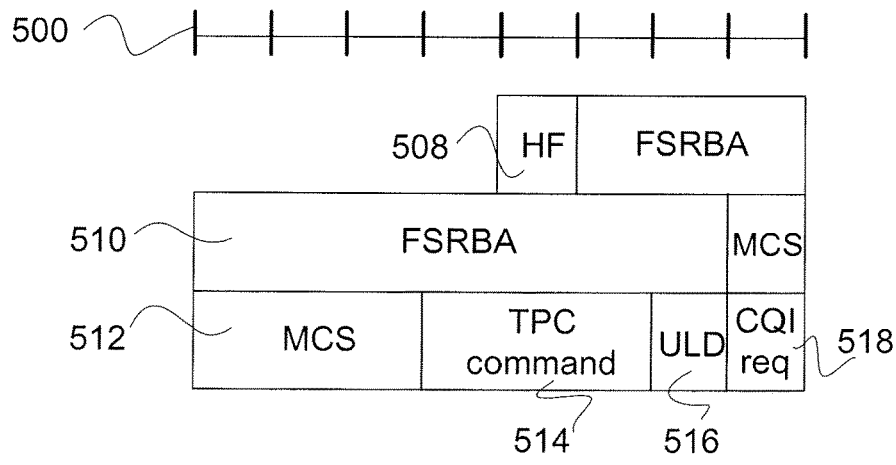
FIG. 5b illustrates a UL grant according to the present standard.

FIG. 5b illustrates the different data fields included in a UL grant field 506 of a MAC RAR message 2D according to the present LTE standard. The contents of the UL grant field 506 is currently specified in 3GPP TS 36.213, "Physical layer procedures". According to this standard, the UL grant field 506 comprises a Hopping Flag (HF) field 508 of 1 bit, a Fixed Size Resource Block Assignment (FSRBA) field 510 of 10 bits, a truncated Modulation and Coding Scheme (MCS) field 512 of 4 bits, a Transmit Power Control (TPC) command for scheduled PUSCH 514 of 3 bits, a UL delay (ULD) field 516 of 1 bit and a Channel Quality Indicator (CQI) request field 518 of 1 bit. The arrangement of data fields in the UL grant field 506 of FIG. 5b is an example only, and alternative arrangements may be used.

In some embodiments of the invention, a new interpretation of the MCS field 512, as signalled in a UL grant 506, is introduced. In this embodiment, the same format of the UL grant 506 as is defined in the present standard may be used, but the interpretation of the MCS field 512 will differ. Such new interpretation could for example be used in UEs 105 operating according to release 10 of the LTE standard (so called Rel-10 UEs) or according to later versions of the LTE standard.

According to the current LTE standard (3GPP TS 36.213, v. 8.6.0, Release 8), the 4-bit truncated MCS field 512 points to a single MCS Index (0-15), each MCS Index corresponding to a transport format defined by a Modulation Order Index pointing to a modulation and coding scheme; a Transport Block Size (TBS) index pointing to a transport block size; and a Redundancy Version index. A table 600 defining the transport format associated with the different MCS indices according to the current version of the standard is shown in FIG. 6a, the table 600 including columns for MCS Index 605; Modulation Order Index 610; TBS Index 615 and Redundancy Version Index 620 (the Redundancy Version index 620 is mainly used for HARQ retransmissions with increased redundancy, and will not be further discussed here). In the current standard, the MCS indices 16-31 can be used for scheduling of UEs 105 in the connected mode, but not for scheduling of UEs in the idle state. However, for example if more than 4 bits were used to represent the MCS field 512 in a UL grant 506 of a MAC RAR message 2D, the MSC field 512 could be used to convey one of more than 16 different values of the MSC index.

Hence, when a value of the MCS Index is transmitted in an MCS field 512 of a UL grant 506 to a UE 105 of the current version of the LTE standard, the transport format to be used by the UE 105 is uniquely defined by table 600.

In some embodiments of the invention, however, a value of the MCS Index transmitted to a UE 105 will be interpreted as corresponding to a set of available transport format, from which the UE 105 can select a transport format, for example depending on measured path loss and/or UE buffer status. Such set of available transport formats could for example be defined by adding an offset one or more times to the received MCS Index in an MCS field 512 of a UL grant 506 in order to arrive at one or more further MCS indices, each MCS index pointing to a transport format in a table 600. A table 600 similar to that of FIG. 6a could be used in this embodiment to define a relation between an MCS index and a transport format. For example, if the MCS index signalled in the UL grant 506 is "3", and a predefined value of the offset is "1", then a set of three available transport formats could be defined by the MCS indices 3, 4 and 5. The corresponding Modulation Order Index, TBS Index and Redundancy Version Index could be found for example in table 600 of FIG. 6a. The number of different transport formats to be included in the available set, and which the UE 105 could derive by means of the offset, could advantageously be pre-determined. The value of the offset could for example be derived by the UE 105 from a predefined formula. The output of the formula could, for example, depend on the UE transmit buffer status, the measured downlink path loss and/or the available transmit power. In one embodiment, the formula could simply be a constant, yielding a predefined value of the offset (cf. the example given above). The offset could be defined so that the difference between two adjacent MCS indices in the set is constant, or so that the offset between two adjacent MCS indices varies within the set. Other formulas for defining further MCS indices than by adding an offset could alternatively be used.

Alternatively, a set of available transport formats could be derived, from an MCS index signalled in an MCS field 512, by means of a table corresponding to an extended table 600. An example of such an extended table 650 is shown in FIG. 6b. To the MCS index column 605 in extended transport format table 605 of FIG. 6b is associated columns corresponding to two different transport formats, each represented by a Modulation Order Index column 610a/610b and a TBS Index column 615a/615b, as well as a Redundancy Version index 620a. Modulation Order Index column 610a and TBS Index column 615a serve to define a first transport format, and columns 610b and 615b serve to define a different transport format. Hence, each value of an MCS index defines, via extended table 650 of FIG. 6b, a set of two different transport formats. The extended table 650 of FIG. 6b is an example only, and an extended table 650 could associate an MCS index with any number of transport formats, by including a suitable number of Modulation Order index columns 610 and TBS Index columns 615. Furthermore, the values of the modulation order index and TBS index given in columns 610a&b and 615a&b, respectively, are given as examples only, and a given MCS index could be defined to correspond to different transport formats than those shown in extended table 650 of FIG. 6b.

As mentioned above, in addition to modifying the interpretation of the "Truncated MCS" field of the MAC Random Access Response message 2D, the interpretation of the Fixed Size Resource Block Assignment field 510 might also be changed, in some embodiments, to support the allocation of differing amounts of resource blocks, so that the UE 105 can select a suitable amount of resource blocks from a set of available Fixed Size Resource Block Assignments.

Figure 7A:
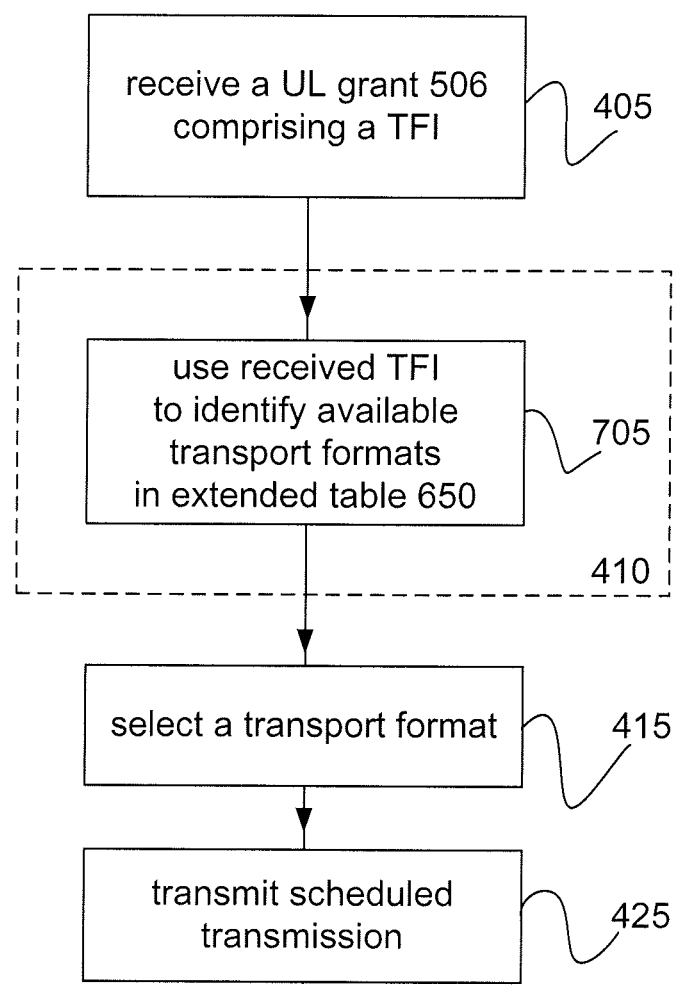
FIGS. 7a-c are flowcharts schematically illustrating a part of the procedure of FIG. 4 in more detail for three different embodiments of the procedure, respectively.

FIG. 7a illustrates an example of an implementation of step 410 of FIG. 4, wherein an extended table 650 is used to determine the set of available transport formats. In step 405, a UL grant 506 comprising a TFI (e.g. an MSC index) is received. Step 410 FIG. 7a comprises a step 705, wherein the TFI received in step 405 is used to look up available transport formats in an extended table 650.

Figure 7B:
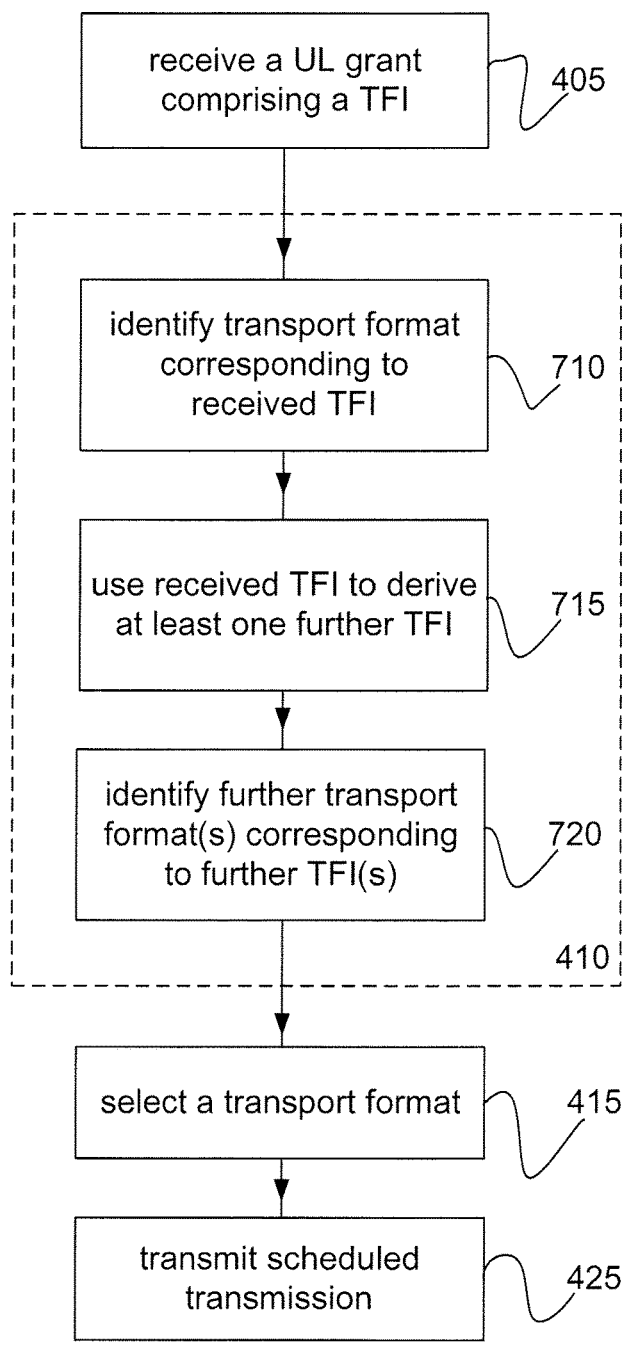

FIG. 7b illustrates an example of another implementation of step 410 of FIG. 4, wherein the set of available transport formats is identified by deriving further TFIs from a received TFI. In step 405, a UL grant 506 comprising a TFI (e.g. an MSC index) is received. Step 410 of FIG. 7b comprises a step 710, wherein a first transport format is identified which corresponds to the TFI received in step 405, for example by use of a table 600 (cf. FIG. 6a). Moreover, step 410 of FIG. 7b comprises a step 715, wherein at least one further TFI is derived by use of the received TFI—for example by adding an offset to the received TFI one or more times, depending on how many further TFI(s) are to be determined. A transport format for each derived further TFI(s) can then be identified in step 720, for example by means of a transport format table 600. Steps 710 would not have to be performed prior to step 715, but could be performed after step 715 and/or step 720.

In the embodiments illustrated by FIGS. 7a and 7b, an indication could be included, if desired, in the MAC RAR message 2D to indicate to the UE 105 whether the new interpretation of the UL grant 506 should be used or not. Such an indication could for example be given in the reserved bit 502. This could for example be useful in situations where an eNB 110, which normally supports transport format selection by the UE 105, is resource limited.

Figure 7C:
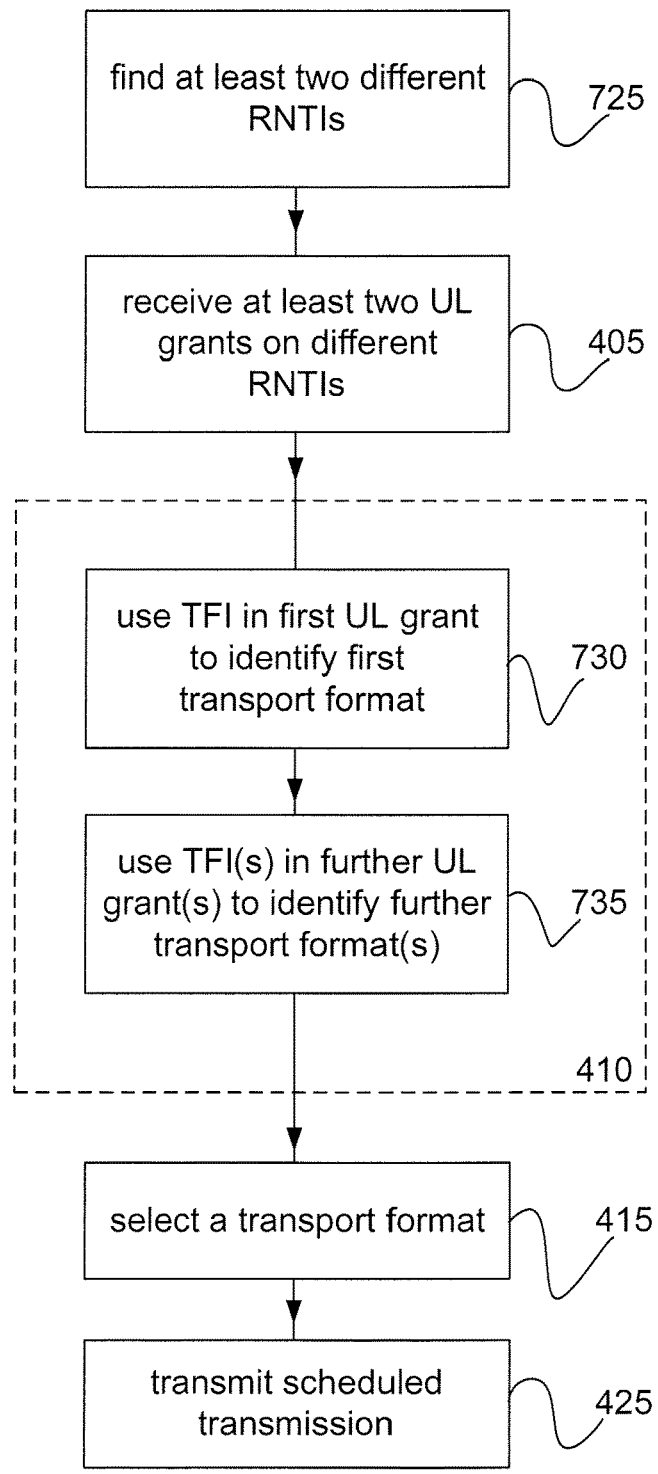

A yet further example of an implementation of step 410 of FIG. 4 is shown in FIG. 7c. In this embodiment, at least two different UL grants 506 are received in step 405, the different UL grants 506 having been sent using different Radio Network Temporary Identifiers (RNTIs). In a random access scenario, the relevant RNTIs are RA-RNTIs. Different UL grants 506 could for example be transmitted in separate messages capable of conveying a UL grant to a UE 110, such as for example in separate MAC RAR messages 2D in a random access scenario, or, when the method of FIG. 4a/b is performed in another scenario, in other separate messages capable of conveying a UL grant to a UE 110. The different UL grants 506 comprise different TFIs. In step 725 of FIG. 7c, the UE 105 calculates different RNTIs. In a random access scenario, for example, the calculation of different RA-RNTIs in step 725 could be based on the RACH preamble 2B (cf. FIGS. 2 and 3), using a different formula for obtaining each of the different RA-RNTIs. One RA-RNTI could for example be obtained by using the formula provided in 3gpp TS 36.321 v. 8.5.0, section 5.1.4:

$$\text{RA-RNTI} = 1 + t\_id + 10 * f\_id \quad (1a),$$

where t_id is the index of the first subframe of the specified PRACH ($0 \leq t\_id < 10$), and f_id is the index of the specified PRACH within that subframe, in ascending order of frequency domain ($0 \leq f\_id < 6$). Another RA-RNTI could then for example be obtained by use of a similar formula, where an offset n has been added to the formula given in expression (1a):

$$\text{RA-RNTI} = 1 + t\_id + 10 * f\_id + n \quad (1b),$$

where n is selected so that none of the RA-RNTI values obtained by expression (1a) can be obtained by expression (1b), for example $n \geq 60$. A third RA-RNTI could be obtained by using a formula where a different offset is added to the formula given in expression (1a), etc.

In an uplink transmission scenario wherein one of the methods of FIGS. 7a and 7b is employed, a single RNTI is typically calculated by the UE 105 and used in the decoding of the received UL grant 506, although this step is not shown in FIGS. 7a and 7b. In step 405 of FIG. 7c, the UE 105 receives at least two UL grants 506 of different RNTIs. The eNB 110 has used the different RNTIs in the coding of the different UL grants 506. Thus, the UE 105 could use the different RNTIs for decoding the different UL grants 506 transmitted to the UE 105.

In step 410 of FIG. 7c, the set of at least two available transport formats is identified by use of the TFIs received in the at least two UL grants received in step 405: In step 730, a TFI in a first UL grant is used to identify a first transport format, while in step 735, TFI(s) in further UL grant(s) are used to identify further transport format(s). In each of steps 730 and 735, a transport format may for example be identified by use of a transport format table 600 of FIG. 6a (cf. step 710/720 of FIG. 7b).

Thus, in the embodiment of FIG. 7c, the interpretation of a MAC RAR message 2D can remain the same as in the present standard, while a UE 105 is scheduled on at least one new RNTI, in addition to the scheduling on the (single) RNTI as performed in the current version of standard. Scheduling of the UE 105 on more than one RNTI would allow the eNB 110 to schedule UEs 105, which have the capability of selecting a transport format from a set of available transport formats, differently to those UEs 105 having no such capability, since only UEs 105 having this capability would listen for UL grants 105 on the second/ further, additional RNTI. As mentioned above, a new formula on how to calculate the second/further RNTI could advantageously be defined for UEs 105 having this capability, as for eNBs 110 which support the allocation of a set of available transport formats to UEs 105.

In the embodiment of FIG. 7c, the further UL grant(s) 506 can be used in different ways in terms of resource scheduling. For example, the further UL grant(s) 506 can point to the same Resource Blocks (RB) as the first UL grant 506, but with a different modulation order and/or different TBS (implemented for example as a different value in the MCS field 512). The UE 105 can then select a suitable transport format from the different transport formats indicated in the different UL grants 506. Alternatively, the further UL grant(s) 506 can point to different Resource Blocks than the first UL grant 506, so that the value of the Fixed Resource Block Assignment field 510 differs between the different UL grants 506. By letting the different UL grants 506 point to different resource blocks, the UE 105 can be provided with additional resources to transmit the scheduled transmission, so that the chances of fitting a combined message 3A into the scheduled transmission will increase. Hence, in such an implementation, step 425 could comprise sending the scheduled transmission over resource blocks which have been assigned in at least two different UL grants 506. For example, in the random access scenario of FIG. 2B where a combined message 3A is to be transmitted, the RRC connection request could be transmitted on resource blocks assigned in a first UL grant and the NAS service request on resource blocks assigned in a second grant. Since the different RA-RNTIs relate to the same RACH preamble 2B, the eNB 110 can be arranged to combine transmissions on the resource blocks allocated in the different UL grants 506.

In the methods shown in FIGS. 7a-7c, steps 415 and 425 are performed as in FIGS. 4a/b.

The operation of the eNB 110 will now be further discussed. When an eNB 110 has made available for a UE 105 a set of transport format, and the selection of a transport format is performed by the UE 105, the eNB 110 will, upon receipt of a scheduled transmission from the UE 105, be unaware of which transport format the UE 105 selected for the transmission in several of the described embodiments. In order to decode the scheduled transmission, the eNB 110 could therefore use blind detection. Blind detection typically involves selecting a first transport format from the set of transport formats available to the UE 105; using the selected first transport format for decoding of the scheduled transmission; calculating a checksum over the decoded result; and checking if the checksum received in the scheduled transmission corresponds to the value of the calculated checksum. The checking of the checksum could e.g. involve a conventional Cyclic Redundancy Check (CRC). If the calculated checksum does not correspond to the received checksum, a further transport format is selected by the eNB 110 from the set of transport formats available to the UE 105, and the further selected transport format is used for decoding the scheduled transmission etc. The process is typically repeated until a transport format is found for which the calculated checksum corresponds to the received checksum, or until decoding has been performed by means of all transport formats available to the UE 105. In an embodiment wherein at least two UL grants 506 are transmitted on different RA-RNTI and the at least two UL grants 506 point to different resource blocks, no blind detection is required.

Figure 8A:
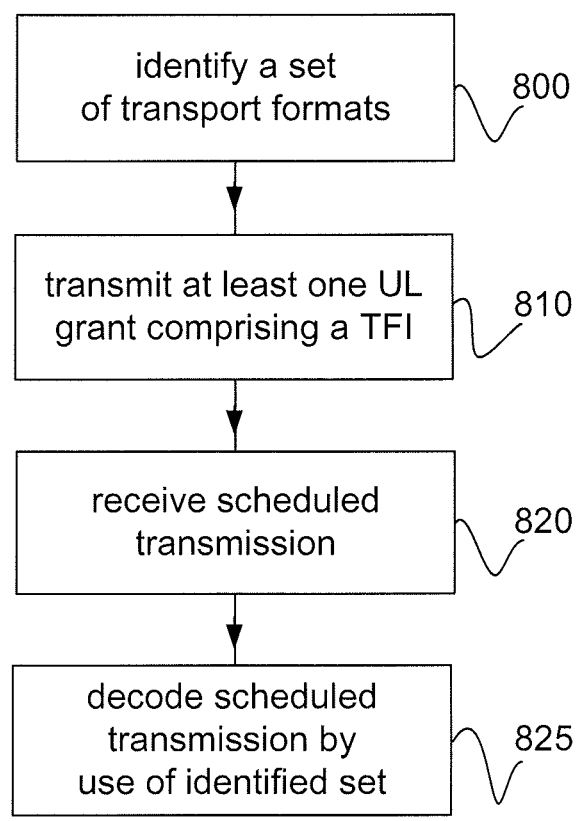
FIG. 8a is a flowchart schematically illustrating an embodiment of method performed in an eNB for facilitating uplink transmission.

FIG. 8a schematically illustrates an example of a method performed by the eNB 110 in order to facilitate for uplink transmission from a UE 105. The method could for example be performed in response to receipt of an RA preamble 2B. In step 800, identification of a set of transport formats to be available for a scheduled transmission from a UE 105 is performed. In step 810, at least one UL grant 506 is transmitted, where a UL grant 506 comprises a TFI, such as for example a MCS index, where the TFI is associated with at least one of the transport formats of the set, e.g. in a transport format table 600 or in an extended transport format table 650. A transmitted UL grant 506 could for example correspond to a UL grant 506 of the current standard, and could include the TFI in the form of an MCS field 512 carrying an MCS index, as well as a checksum obtained by means of an RNTI. In a random access scenario, the RNTI could e.g. be an RA-RNTI calculated based on the received RACH preamble 2B in a known manner. In step 820, a scheduled transmission (c.f. messages 2F/3A), having been transmitted by the UE 105 using one of the transport formats in the set of transport formats available to the UE 105, is received. In step 825, the scheduled transmission is decoded by use of the identified set of transport formats. Upon transmission of the UL grant(s) performed in step 810, an association between the granted resources (for example the granted RBs) and the identified set of transport formats could advantageously be set up, for example by storing an identification of the granted resources, together with one or more TFIs identifying the set, in a memory or register in the eNB 110. Hence, when a scheduled transmission is received on the granted resources, the set of transport formats which were available to the UE 110 for the scheduled transmission can readily be identified by checking such memory or register.

Decoding of the scheduled transmission can for example be performed by means of by blind detection as described above using transport formats included in the set of transport formats available to the UE 105, or by using one of more particular transport formats in the set. By allowing for blind detection of the received scheduled transmission, the eNB 110 can decode the scheduled transmission without knowledge of which transport format was used by the UE 105 in sending the scheduled transmission. However, in an embodiment wherein at least two UL grants 506 are transmitted on different RNTIs and the at least two UL grants 506 point to different resource blocks, the scheduled message could advantageously be directly decoded by means of the transport format corresponding to the TFI which was transmitted in the UL grant 506 which points to the transmission resources upon which the scheduled message was received.

Figure 8B:
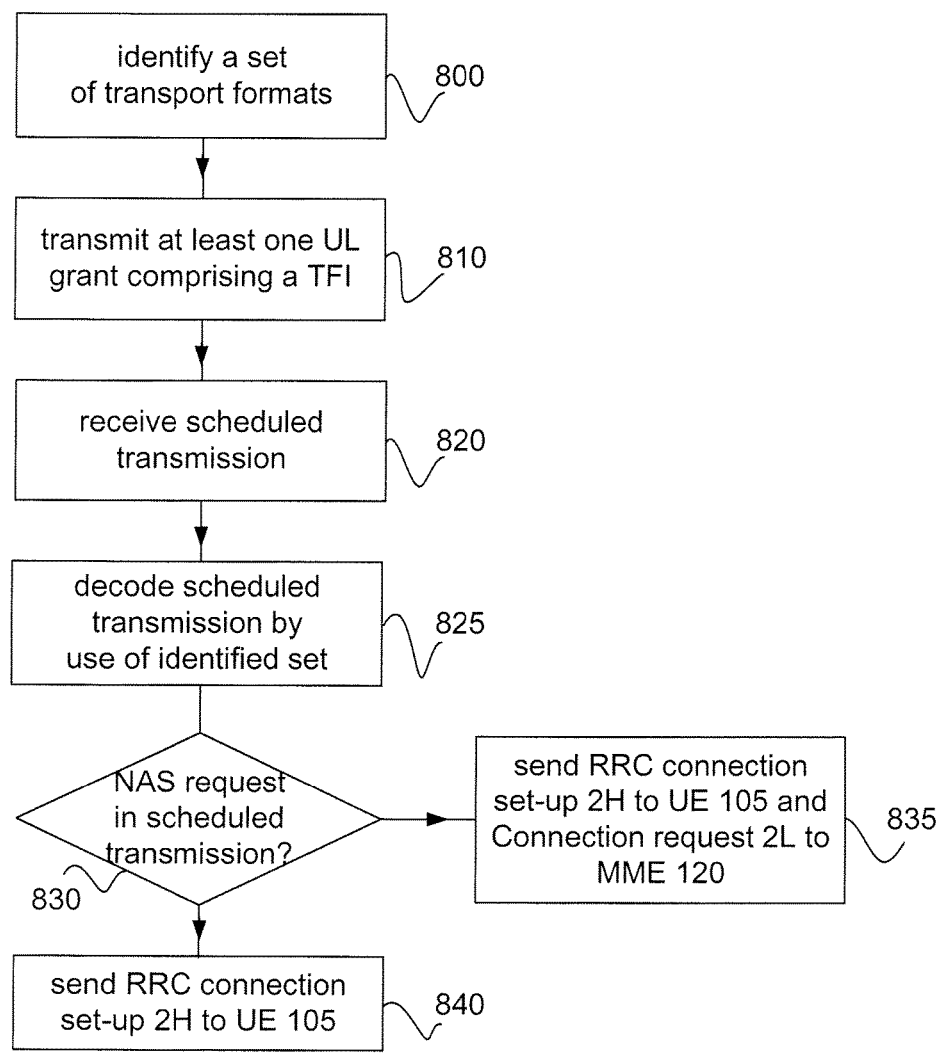

FIG. 8b is a flowchart illustrating an embodiment of an application wherein of the method of FIG. 8a is performed in response to a received RACH preamble 2B. The flowchart comprises additional steps 830-835. When the scheduled transmission has been decoded in step 825, the contents of the scheduled transmission is processed in step 830, where it is determined whether the scheduled transmission comprises a NAS service request. If the scheduled transmission includes a combined message 3A including a NAS service request, then step 835 is entered, wherein an RRC connection set-up 2H is sent to the UE 105 and a Connection request 2L is sent to the MME 120. If the scheduled transmission includes an RRC connection request 2F but not an NAS service request, step 840 is entered, wherein an RRC connection set-up message 2H is sent to the UE 105.

Figure 9A:
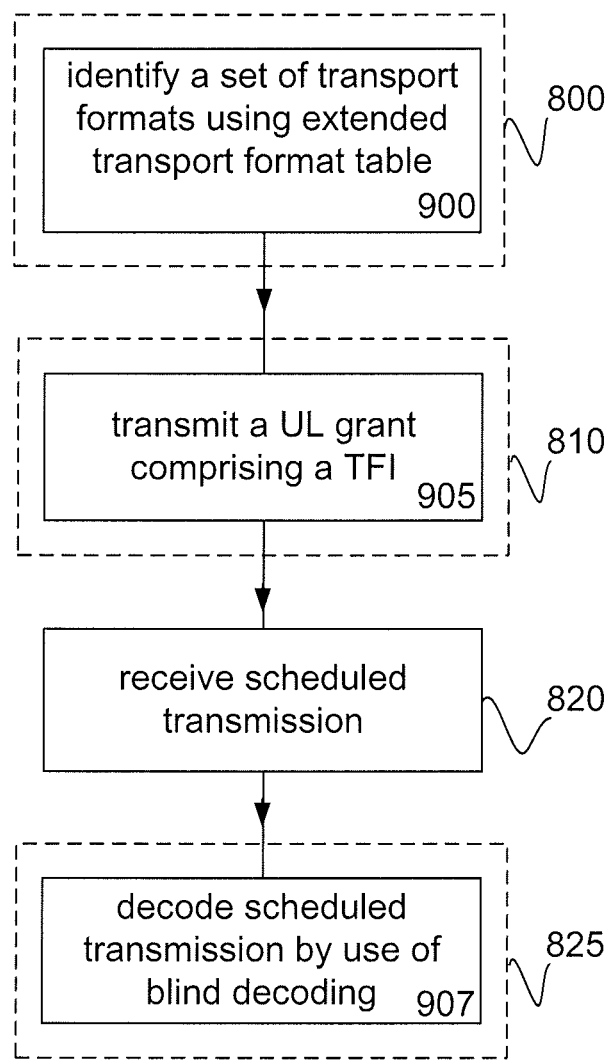
Figure 9B:
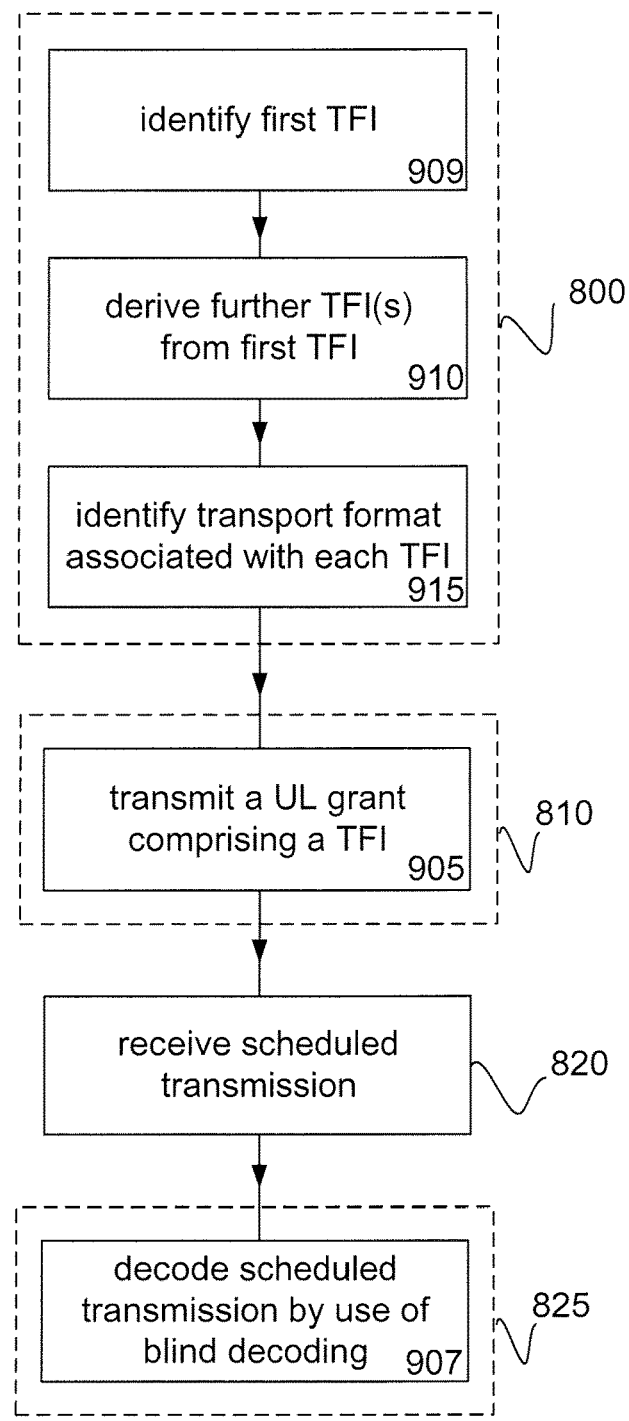
Figure 9C:
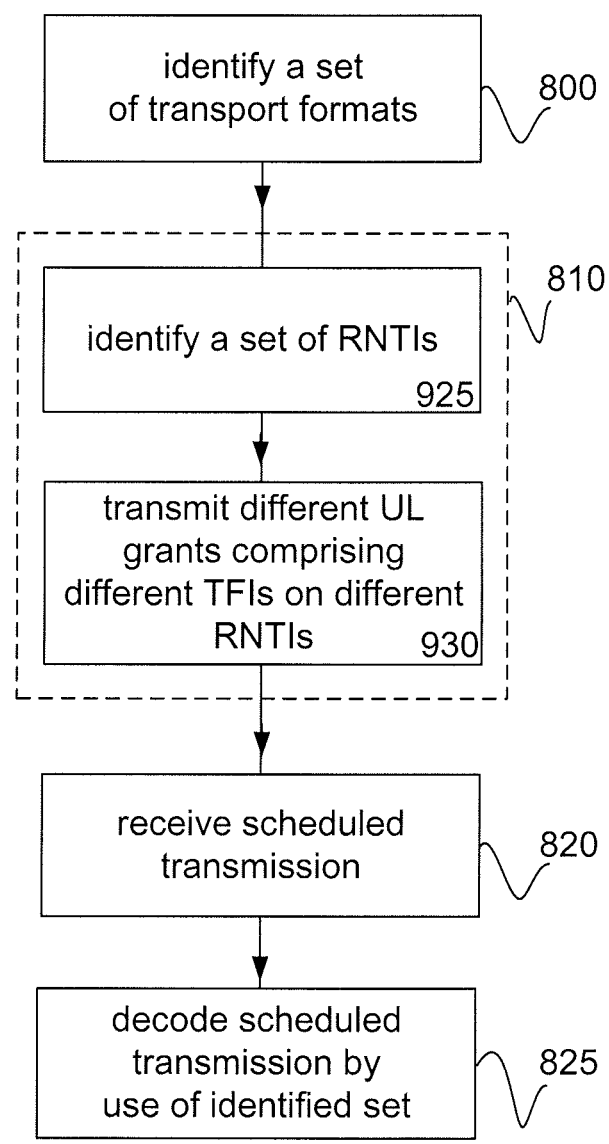

In FIGS. 9a-9c, different embodiments of the procedure shown in FIG. 8a are exemplified in more detail. In FIG. 9a, an embodiment of the transport format set identification of step 800 is performed in step 900, wherein the transport format set identification is performed by use of an extended transport format table 650 (corresponding to the UE performed method shown in FIG. 7a). The identification of step 900 could for example be performed by identifying a TFI, and identifying the transport formats associated with the identified TFI in the extended transport format table 650. An embodiment of step 810, referred to as step 905, is also performed, wherein a UL grant which includes the TFI which is associated with the identified set of transport formats in the extended transport format table is transmitted. Step 820 is then performed, and an embodiment of step 825, referred to as step 907, wherein the scheduled transmission is decoded by use of blind decoding is then performed.

In FIG. 9b, an embodiment of FIG. 8a corresponding to the UE procedure shown in FIG. 7b is illustrated. Step 800 of FIG. 9b comprises a step 909, wherein a first TFI is identified. In step 910, one or more further TFIs are derived from the first TFI, for example by adding an offset to the first TFI one or more times in a manner described in relation to FIG. 7b. In step 915, a transport format associated with each of the first and further TFIs is identified, for example by use of a transport format table 600. To carry out step 810, step 905 is also performed, wherein one of the first and further TFIs is included in the transmitted UL grant. In this embodiment, wherein a UE 105 operates according to the method shown in FIG. 7b and the eNB 110 operates according to FIG. 9b, the way of deriving the further TFIs from the first identified TFI in the eNB 110 should be related to the way of deriving the further TFIs from the received TFI in the UE 105, so that the same set of TFIs is achieved in both the UE 105 and the eNB 110. If the same way of deriving is used, then the TFI included in the transmitted UL grant 506 in step 905 is the first TFI. However, depending on how the way of deriving further TFIs in the UE 105 is related to that of the eNB 110, one of the further TFI(s) could instead be included in the transmitted UL grant 506. Steps 820 and 907 are then performed.

Parts of step 800 of FIGS. 7a and 7b could, in some implementations, be performed after step 810. For example, a TFI could be identified in step 900 prior to the transmission of the UL grant 506 of step 805, while the transport formats associated with the TFI in the extended transport format table 650 could be identified after step 905 has been performed, if desired. Similarly, steps 915 or 910 and 915 could be performed after step 810 in FIG. 7b. In the random access scenario, the value of a transmitted TFI could for example be a standard value of an MCS index used in response to a received RACH preamble 2B. The value of the transmitted TFI could for example be predefined, so that the identification of the TFI of steps 900 and 909 simply involves retrieving the predefined TFI value from a memory, or the value of the TFI to transmit could be selected in dependence on the current circumstances—for example depending on the current load in the eNB 110.

In FIG. 9c, corresponding to the UE procedure illustrated in FIG. 7c, identification of a set of transport formats is performed in step 800. The set of transport formats could be predefined, or could be selected depending on current circumstances. The UL grant transmission step 810 comprises a step 925 wherein a set of different RNTIs are identified, and a step 930 wherein different UL grants 506 are then transmitted on different RNTIs, the different UL grants 506 including different TFIs pointing to different transport formats in the identified set of transport formats. The identification of RNTIs of step 925 should advantageously use the algorithm used by the UE 105 for obtaining RNTIs, or a related algorithm so that the RNTIs identified in step 925 are the same as those identified in step 725. In this embodiment, the UE 105 could advantageously send a UL grant 506 for each transport format included in the set of transport formats available to the UE 105. The identification of the entire set of transport formats of step 800 could be performed prior to step 810, or the transport formats could be identified and corresponding UL grants 506 transmitted one at a time.

As mentioned above in relation to FIG. 7c, a further UL grant 506 could point to the same resource blocks (RBs) as the first UL grant 506, or different UL grants 506 could point to different RBs. An eNB 110 could be arranged to always generate further UL grants 506 to point to the same RBs as the first UL grant; to always generate different UL grants 506 which carry information on the same set of available transport formats to point to different RBs; or to generate different UL grants 506 to point to the same or different RBs. In one implementation of the method of FIG. 9c, the different UL grants 506 could in some circumstances point to the same RBs, for example if the eNB 110 is currently resource limited, while in other circumstances, the different UL grants 506 could point to different RBs. A mechanism in the eNB 110, by which different UL grants 506 could be generated to point to different RBs, could advantageously be arranged to schedule RBs in a manner so that the RBs of the different UL grants 506 are frequency-adjacent to one another, or restricted to separate subframes. In this way, the single frequency property could be maintained, the single frequency property being that the UL transmissions from a UE 105 are contiguous in the frequency domain. However, in a network where there is no single frequency requirement, RBs of different UL grants 506 do not need to be adjacent or restricted to separate subframes.

If the eNB 110 includes a mechanism by which different UL grants 506 relating to the same set of available transport formats can point to different RBs, the eNB 110 could advantageously further include a mechanism for combining transmissions received on different RBs to which the different UL grants 506 point. The eNB 110 could then include a register or memory where different RBs, assigned to different UL grants in the same set of available transport formats, can be stored, so that the eNB 110 can keep track of which UL grants 506 relate to the same set of available transport formats, and thus to the same UE 105. Upon receipt of a scheduled transmission using a particular RB, the eNB 110 could check the register to identify to which UL grant 506 or UE 105 the scheduled transmission belongs. Some signalling rationalizations can be made, e.g. in that the UE 105 would not need to send a UE identifier in more than one of the transmissions relating to the same set of available transport formats.

In some embodiments, a broadcast indication from the eNB 110 is used to indicate whether the eNB 110 supports one or more of the above described techniques for making available to a UE 105 a set of transport formats from which the UE 105 can select a suitable transport format. A broadcast indication could for example be transmitted in an existing broadcast message relating to the random access procedure, such as for example the System Information Block Type 2. By broadcasting such an indication, it can be avoided that a UE 105, which is transport format selection capable, tries to access an eNB 110, which does not support UE transport format selection, by using a transport format obtained via a TFI as obtained in step 705 or steps 715-720.

The broadcast of an indication is particularly useful in the embodiments illustrated by FIGS. 7*a*/9*a* and 7*b*/9*b*, respectively, wherein a TFI transmitted in a UL grant 506 can be interpreted to indicate a set of available transport formats. The broadcasted indication could for example be a flag taking a first value if the mechanism is supported by the eNB 110. In the embodiment of FIGS. 7*b* and 9*b*, the broadcast indication could for example include a value of the offset to be used by UE 105 in determining further transport formats. If a value of such an offset is broadcasted, it could be implicitly assumed by a UE 105 that the broadcasting eNB 110 supports UE transport format selection. By broadcasting the offset to be used to obtain further transport formats, the value of the offset could easily be altered by eNB 110, for example in response to a changing load in the cell served by the eNB 110; in response to an instruction received via a user interface, etc.

In a communications system 100 wherein no information is broadcasted relating to whether or not an eNB 110 supports UE transport format selection, a UE 105 could for example attempt to send the scheduled transmission (e.g. message 2F or 3A) using a weaker coding if the selection step 415 of FIG. 4*a* so indicates, and if this attempt fails, the UE 105 could re-send the scheduled transmission using a stronger coding.

Figure 10:
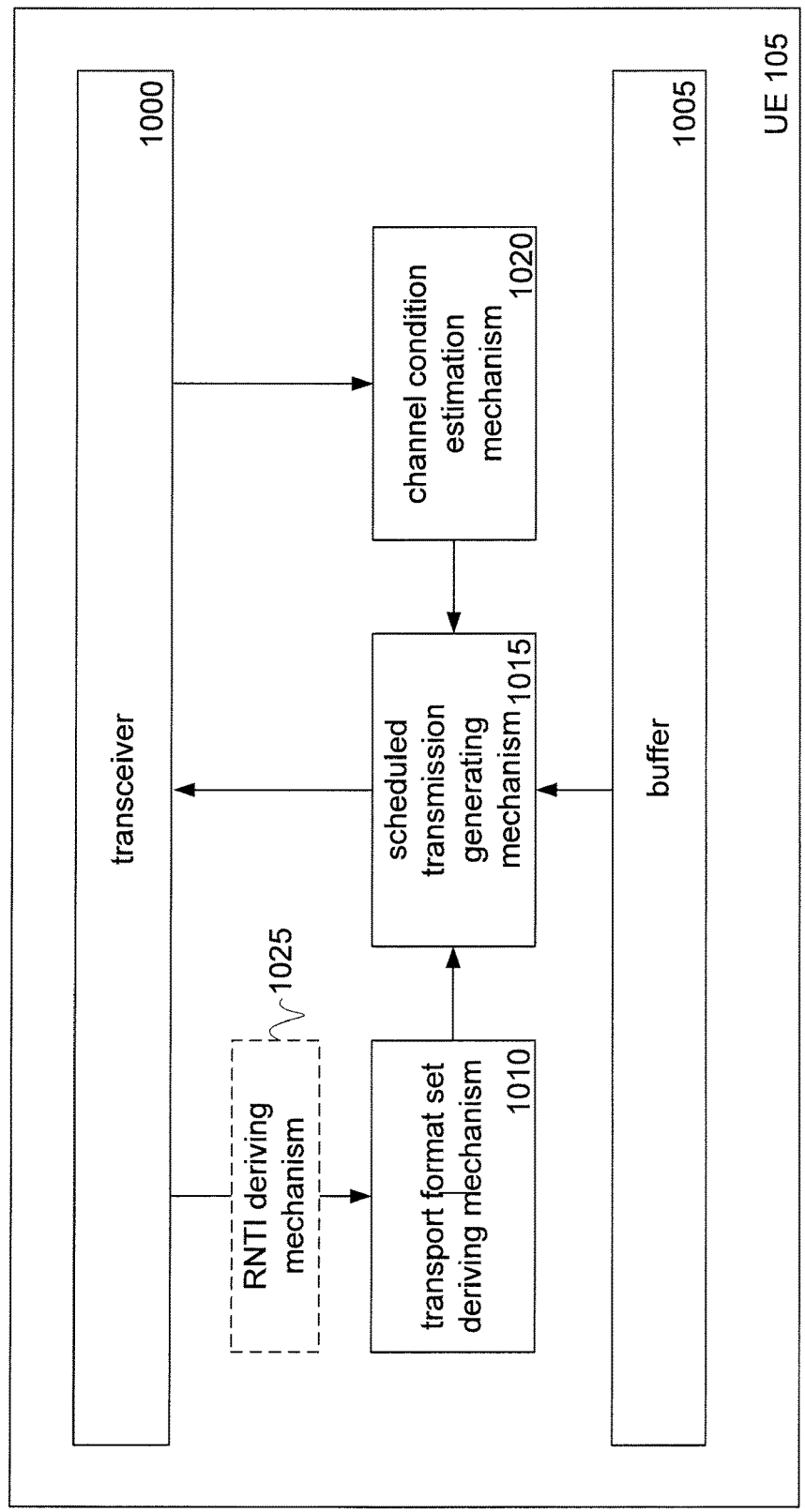
FIG. 10 schematically illustrates an example of a UE supporting UE transport format selection.

In FIG. 10, an example of a UE 105 capable of performing the above described transport format selection procedure is schematically shown. The UE 105 of FIG. 10 comprises a transceiver 1000 for receiving and transmitting information to and from the UE 105. The UE 105 further comprises a buffer 1005, storing data waiting to be transmitted by the UE 105. Buffer 1005 often comprises one buffer part for control plane signalling, and another buffer part for user plane data. The UE 105 of FIG. 10 further comprises a transport format set deriving mechanism 1010, a scheduled transmission generating mechanism 1015 and a channel condition estimation mechanism 1020. The transport format set deriving mechanism 1010 of FIG. 10 is responsively connected to the transceiver 1000 (directly or indirectly) and programmably configured to determine a set of available transport formats in response to receipt of at least one UL grant 506. The decoding of the UL grant 506 is typically performed in a decoder (not shown), of which the transport format set deriving mechanism 1010 may or may not form a part. The transport format set deriving mechanism 1010 is arranged to receive a TFI which has been extracted from a UL grant 506 by the decoder, and to determine a set of available transport formats by use of at least one TFI, for example in a manner shown in step 410 of FIG. 7*a*, 7*b* or 7*c*.

Transport format set deriving mechanism 1010 is further connected to the scheduled transmission generating mechanism 1015 and programmably configured to output a signal indicative of the set of available transport formats to the scheduled transmission generating mechanism 1015.

The UE 105 is arranged to receive UL grants 506 on different RNTIs, such as an allocated Cell (C)-RNTI or a RA-RNTI derived in accordance with expression (1a). When the UE 105 is arranged to operate according to the method illustrated in FIG. 7*c*, the transport format set deriving mechanism 1010 could advantageously include an RNTI derivation mechanism 1025, programmably configured to derive at least one further RNTI from a first RNTI or from a RACH preamble 2B, for example by use of expression (1b), or from a table listing an association between different values of a first RNTI (or other RNTI identifier) and further RNTIs. The RNTI deriving mechanism 1025 derive different RNTIs on which UL grants 506 could be received. Since the RNTI deriving mechanism 1025 is mainly applicable to an embodiment of the UE 105 arranged to operate according to the method illustrated by FIG. 7*c*, the RNTI deriving mechanism 1025 is shown by use of broken lines.

Channel condition estimation mechanism 1020 is connected to the transceiver 1000 and to the scheduled transmission generating mechanism 1015. Channel condition estimation mechanism is programmably configured to estimate the uplink channel condition, for example by measuring the downlink path loss on a signal received from the receiver 1000, and to forward a signal indicative of this estimate to the scheduled transmission generating mechanism 1015.

Scheduled transmission generating mechanism 1015 responsibly connected to the transport format set deriving mechanism 1010, and is further connected to the buffer 1005 to receive data to be transmitted in a scheduled transmission, as well as to the transceiver 1000, to forward a scheduled transmission to the transceiver 1000. The connection between the scheduled transmission generating mechanism 1015 and the buffer 1005 could also be used to transfer UE buffer status information from the buffer 1005 to the scheduled transmission generating mechanism 1015.

The scheduled transmission generating mechanism 1015 is programmably configured to select a transport format from the set of available transport formats, in a manner described in relation to step 415. Scheduled transmission generating mechanism 1015 is furthermore programmably configured to determine the contents of the scheduled transmission, for example in the manner described in relation to an embodiment of step 415 of FIG. 4*a*, or in the manner described in relation to step 420 of FIG. 4*b*. For example, the scheduled transmission generating mechanism 1015 could be arranged to determine whether a core network service request is to be included in a scheduled transmission sent in response to a MAC RAR message 2D, or whether an RRC Connection request only should be included. Scheduled transmission generating mechanism 1015 is also arranged to convey the contents of the scheduled transmission message to the transceiver 1000 for transmission.

Figure 11:
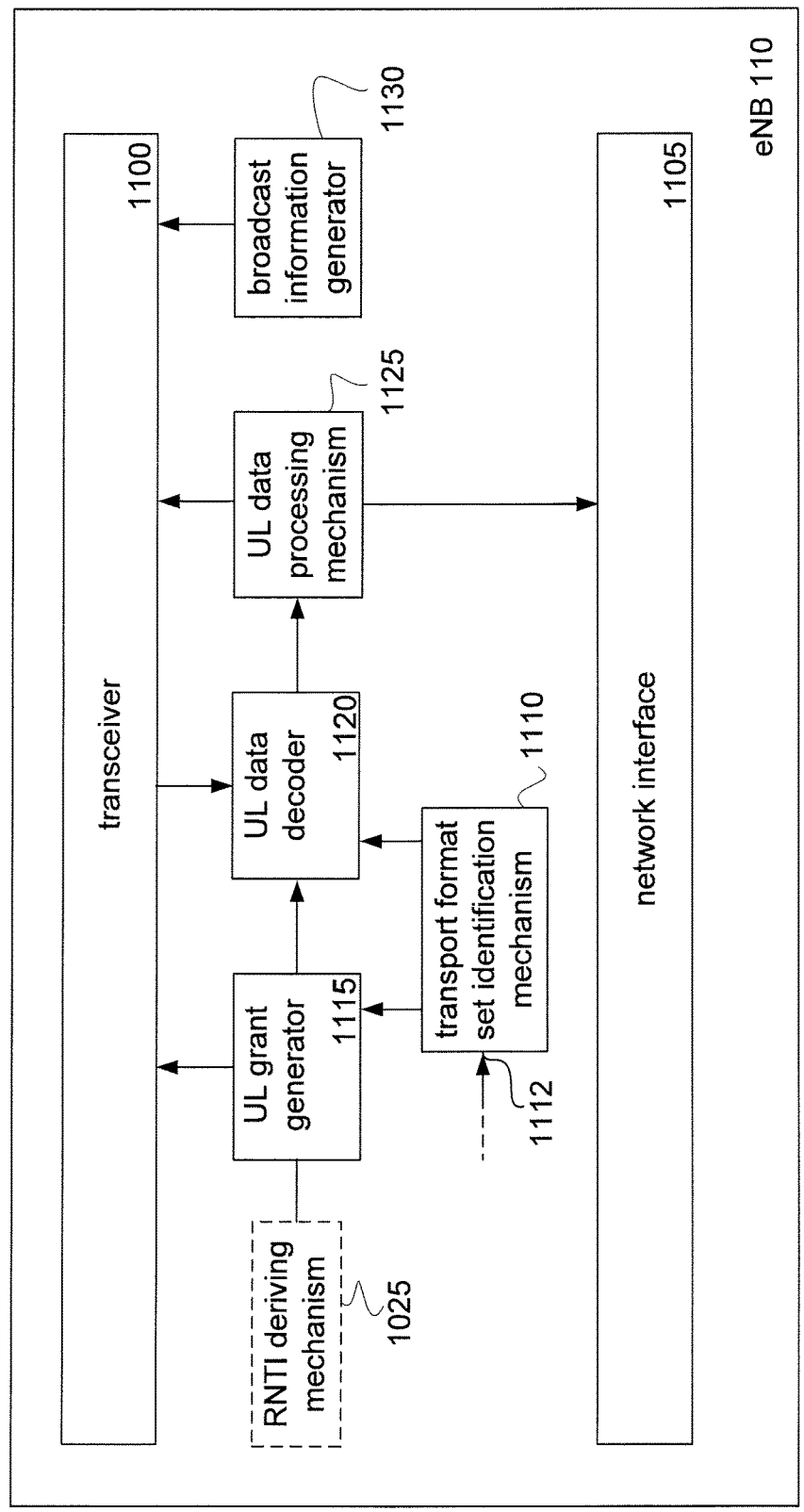
FIG. 11 schematically illustrates an example of an eNB supporting UE transport format selection.

FIG. 11 is a schematic illustration of an example of an eNB 110 which supports transport format selection by a UE 105. The eNB 110 of FIG. 11 comprises a transceiver 1100 for sending and receiving data to/from the UE 105, a network interface 1105 for sending and receiving data to/from the core network, a transport format set determination mechanism 1110, a UL grant generator 1115, a UL data decoder 1120, a UL data processing mechanism 1125, and a broadcast information generator 1130. The UL grant generator 1115 is typically part of a scheduler arranged to schedule UL transmissions.

The transport format set identification mechanism 1110 is programmably configured to perform transport format set identification when a set of transport formats is to be made available for a scheduled transmission from a UE 105 as described above. The mechanism 1110 typically has a trigger signal input 1112, arranged to receive a signal triggering the identification of a transport format set. In for example the random access scenario, the mechanism 1110 could be arranged to identify a transport format set in response to a signal from a preamble decoder having decoded a RACH preamble 2B. The transport format set identification mechanism is connected to the UL grant generator 1115 and programmably configured to send a signal indicative of a TFI (in the embodiments of FIGS. 9*a* and 9*b*) or at least two TFIs (in the embodiment of FIG. 9*c*) to the UL grant generator 1115, where the TFI(s) is associated with the identified transport format set. In an eNB 110 operating according to a method illustrated in FIGS. 9*a* and 9*b*, the UL grant generator 1115 is responsively connected to the output of the mechanism 1110, and programmably configured to generate one UL grant 506 in response to such signal—in an eNB 110 operating according to the method illustrated inter alia in FIG. 9*c*, the UL grant generator 1115 is programmably configured to generate at least two UL grants 506 in response to the signal, in accordance with the above description. In this embodiment, the signal could for example include a set of sub-signals, each indicative of a TFI pointing to a transport format of the set.

The UL grant generator 1115 is connected to the transport format set identification mechanism 1110 and arranged to generate at least one UL grant 506 in response to receipt of a signal from the transport format set identification mechanism 1110, the at least one UL grant 506 including a TFI pointing to a transport format as described above. The UL grant generator is further arranged to forward the generated UL grant(s) 506 to the transceiver 1110.

The transport format set identification mechanism 1110 is furthermore advantageously connected to the UL data decoder 1120, either directly as shown in FIG. 11, or via the UL grant generator 1115. The transport format set identification mechanism 1110 is arranged to send a signal to the UL data decoder 1120 indicative of the TFI(s) included in the generated UL grant(s) 506.

When the eNB 110 is arranged to operate according to the embodiment illustrated by FIG. 9*c*, the eNB 110 could advantageously include a RNTI deriving mechanism 1025 connected to the UL grant generator 1115 (cf. FIG. 10), in order to derive different RNTIs to be used in encoding of different UL grants 506.

The UL data decoder 1120 is furthermore responsively connected to the transceiver 1100 and arranged to receive and decode a scheduled message received in response to a transmitted UL grant 506. In one embodiment of the eNB 110 of FIG. 11, the UL data decoder 1120 is programmably configured to decode scheduled messages by means of blind detection (cf. step 907 of FIGS. 9*a* & 9*b*) using a set of transport formats available to the UE 105 from which the scheduled message originates. In one implementation of this embodiment, the UL data decoder 1120 uses blind detection for decoding a scheduled message if an indication to do so has been received, for example from the UL grant generator 1115. In another embodiment, the UL data decoder uses a transport format associated with the RB upon which the scheduled message is received. As mentioned in relation to FIG. 9*c*, a register or memory could be provided in eNB 110 where associations between different RBs and different UL grants can be stored.

The UL data decoder 1120 is further connected to the UL data processing mechanism 1125, and arranged to send a signal indicative of a decoded scheduled transmission to the UL data processing mechanism 1125. The UL data processing mechanism 1125 is connected to the network interface 1105 and the transceiver in order to be able to send data to UEs and to (or via) the core network (a data encoder (not shown) could be included for this purpose). The UL data processing mechanism 1125 can for example be arranged to send, upon receipt of a combined message 3A, both a connection request 2L to an MME 120 via network interface 1105, and an RRC connection set-up request 2H to the UE 105 via transceiver 1100. The UL data processing mechanism 1125 can further be arranged to send an RRC connection set-up request 2H to the UE 105 via transceiver 1100 upon receipt of an RRC connection request message 2F, without sending the connection request 2L to the MME 120.

eNB 110 of FIG. 11 further comprises a broadcast information generator 1130, arranged to broadcast information indicating that the eNB 110 supports UE transport format selection. If the eNB 110 operates according to the embodiment illustrated in FIG. 9*b*, the broadcasted information could for example be an offset to be used in identifying further transport formats. As discussed above, the broadcast information generator 1130 is optional for the purposes of the present technology.

The eNB 110 shown in FIG. 11 is an example only, and other implementations of the eNB 110 by means of which the methods illustrated by FIGS. 8*a/b* and 9*a/b/c* could be performed could be contemplated.

Figure 12:
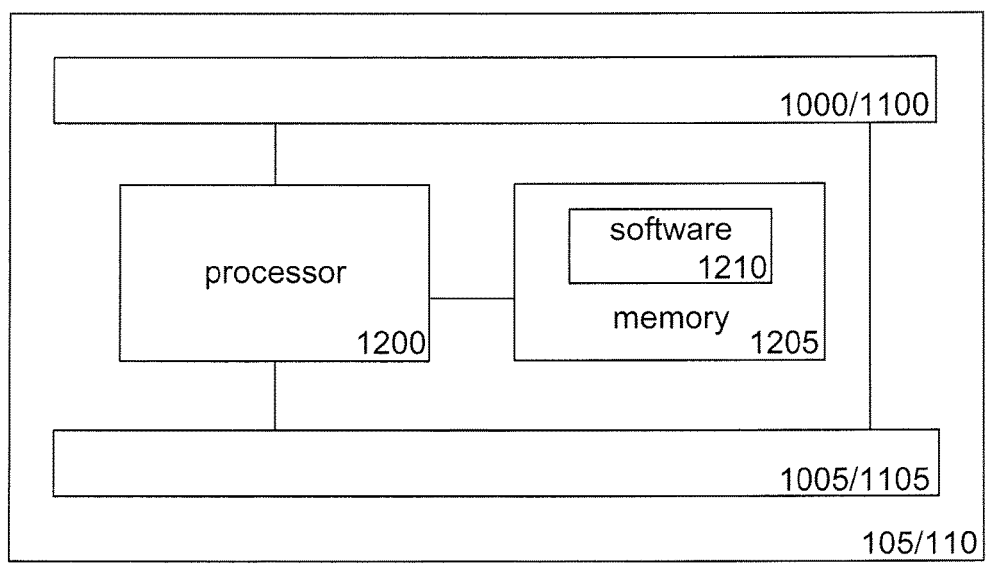
FIG. 12 schematically illustrates an alternative representation of an eNB/UE supporting UE transport format selection.

In FIG. 12, an alternative way of schematically illustrating the UE 105 of FIG. 10 is shown. FIG. 12 shows the UE 105 comprising processing means 1200 connected to a computer program memory 1205, as well as to transceiver 1000 and buffer 1005. The memory 1205 comprises computer readable means that stores computer program(s) 1210, which when executed by the processing means 1200 causes the UE 105 to perform the method illustrated in FIG. 4*a* (or an embodiment thereof). In other words, the UE 105 and its mechanisms 1010, 1015 and 1020 may in this embodiment be implemented with the help of corresponding program modules of the computer program 1210.

The illustration of FIG. 12 could alternatively represent an alternative way of illustrating the eNB 110, wherein the eNB comprises processing means 1200, a memory 1205 that stores computer program(s) 1210, which, when executed by the processing means 1200 causes the eNB 110 to perform the method illustrated in FIG. 8*a* (or an embodiment thereof). Hence, the eNB 110 and its mechanisms 1110, 1115, 1120, 1125 and 1130 may in this embodiment be implemented with the help of corresponding program modules of the computer program 1210.

The processing means 1200 could be one or more processors—for example, in the UE 105 case, one processor of processing means 1200 could be arranged to execute code relating to the scheduled transmission generating mechanism 1015, and another processor could be arranged to execute code relating to the channel condition estimation mechanism 1020 etc, or the same processor could be used for the mechanism 1010, 1015 and 1020. The memory 1205 could be any type of non-volatile computer readable means, such as a hard drive, a flash memory, a CD, a DVD, an EEPROM etc.

With the above described techniques, those skilled in the art will appreciate that the average set-up time in a wireless communications system 100 may be reduced as compared to the present standard, without the need for increasing the resource usage at set-up. Several of the described approaches provide improvements in efficiency versus conventional solutions, as wasteful scheduling of resources to account for worst case conditions can be reduced.

The above described techniques can be used in some cells in a communications system 100, while a conventional, or other, uplink transmission procedure is performed in other cells. For example, UE transport format selection and the transmission of combined messages 3A could be supported in cells with a high cell edge bit rate, while other cells might not support UE transport format selection.

The description above mainly refers to a situation where a RACH preamble 2B is sent as part of an initial access where a transition of a UE 105 from an RRC idle state to an RRC connected state is desired. However, the above described techniques could be equally useful in other situations where a RACH preamble 2B is transmitted by a UE 105, such as for example upon data arrival when the UE 105 has lost UL synchronisation but is still in the connected mode. In this random access situation, the scheduled message sent from the UE 105 in response to the receipt of at least one UL grant 506 as described above, would be a message in the user plane, comprising user data. To base the selection of step 415 on a measure of the size of the present data entity in the UE buffer 1005 could be particularly useful when a RACH preamble has been sent upon loss of UL synchronisation loss, since, depending on the type of information to be transmitted, the UE buffer 1005 could comprise any amount of data which could be included in a scheduled message for which a set of transport format has been made available.

The above described techniques for facilitating for a UE 105 to select a transport format from a set of available transport formats can furthermore be applied in a scenario of contention-based uplink scheduling, wherein an eNB 110 can transmit UL grants 506 using a common RNTI. Contention-based uplink scheduling can for example be applied by an eNB 110 at a point in time when some of its uplink resources have not been allocated to dedicated uplink scheduling. By scheduling such unused resources in a manner so that the resources can be used by any UE 105 on a contentious basis, a more efficient use of the resources in the cell can be achieved—as well as a faster service to the UE 105 that will use the contention-based-scheduled UL resources, since this UE 105 will not have to send, nor await a response to, a scheduling request. Contention based uplink scheduling is further described in the commonly owned international application PCT/EP2009/003017.

In the contention based uplink scheduling scenario, the scheduling eNB 105 will be unaware of which UE 105 will actually use the contention based scheduled UL resources. Hence, the eNB 105 will not be able to make an informed selection of transport format for the contention based scheduled UL resources, since the channel propagation conditions and UE buffer information (where applicable) vary between all the UEs 105 in the cell that are potential users of the contention-based-scheduled UL resources. Under these circumstances, the methods illustrated by FIGS. 4a/b, 7a-c, 8a/b, 9a-c, as well as the UE 105 and the eNB 110 illustrated by FIGS. 10 & 12 and 11 & 12, respectively, can be applied in order to provide some flexibility in the UL scheduling, thereby improving the transmission resource usage of the wireless communications system 100. In this context, an eNB 105 could be provided with a mechanism arranged to send, to the UL grant generator 1115, a signal indicative of UL resources to be used for contention based UL scheduling. The UL grant generator 1115 could be arranged to send contention based UL grants, i.e. UL grants sent in relation to contention based scheduled UL resources, by use of an RNTI which has been allocated for the transmission of contention based UL grants (instead of the RA-RNTI used in the RACH scenario described above). The format of the UL grant 506 could be that shown in FIG. 5b, or any other suitable format. A contention based UL grant 506 comprising a TFI pointing to a transport format could for example be transmitted in an ordinary scheduling grant message. Information relating to which RNTI(s) will be used for the contention based resources could for example be broadcasted by the eNB 110 in a broadcast message, and such broadcast message could also serve to inform the UE 105 in the cell that that the eNB 110 supports UE selection of transport format in relation to contention based UL grants.

Such RNTI is here referred to a Contention Based (CB)-RNTI. In the embodiment illustrated by FIG. 9c, a first CB-RNTI could for example be broadcasted, and a pre-defined algorithm could be used by the UE 105 and the eNB 110 to derive further CB-RNTIs, or a set of CB-RNTI(s) could be broadcasted. Alternatively, the CB-RNTIs could be predefined.

The above techniques have been described in detail in the context of a system 100 operating in accordance with the LTE standard. However, the techniques may be applied to any wireless communications systems in which uplink resources are granted by a base station to mobile terminals and wherein a UL grant can include a TFI. The techniques are particularly useful in circumstances where the base station lacks information necessary to select an optimal allocation of modulation and coding schemes for a specific mobile terminal. In such systems, mobile terminals and base stations may be referred to by other terms than "UE" and "eNB", radio connection request messages and core network service request messages may be defined in a different manner than the "RRC connection requests" and "NAS service requests" described above, a TFI and a resource block assignment indication may be referred to by use of different terms than "MCS index", and "Fixed size resource block assignment", etc.

Although various aspects of the invention are set out in the accompanying independent claims, other aspects of the invention include the combination of any features presented in the above description and/or in the accompanying claims, and not solely the combinations explicitly set out in the accompanying claims.

One skilled in the art will appreciate that the technology presented herein is not limited to the embodiments disclosed in the accompanying drawings and the foregoing detailed description, which are presented for purposes of illustration only, but it can be implemented in a number of different ways, and it is defined by the following claims.

The invention claimed is:

1. A method of performing uplink (UL) transmission in a wireless communications system wherein base stations are arranged to grant UL resources to mobile terminals, the method comprising:
   receiving, in a mobile terminal, a UL grant comprising a transport format indication;
   identifying, in the mobile terminal, a set of available transport formats, the set comprising at least two different transport formats from an extended transport format table matching the received transport format indication;
   selecting, in the mobile terminal, a transport format from the set of available transport formats;
   transmitting, from the mobile terminal, a scheduled transmission using the selected transport format, wherein the scheduled transmission comprises a radio resource control (RRC) connection request; and
   determining, by the mobile terminal, whether to transmit a non-access stratum (NAS) service request with the scheduled transmission comprising the RRC connection request, based on one or both of a buffer status or a link quality.

2. A method of performing uplink (UL) transmission in a wireless communications system wherein base stations are arranged to grant UL resources to mobile terminals, the method comprising:
   receiving, in a mobile terminal, a UL grant comprising a first transport format indication;

identifying, in the mobile terminal, a set of available transport formats by identifying a first transport format to which the first transport format indication points;
determining at least a second transport format indication by use of the first transport format indication; and
identifying at least a second transport format as a transport format to which the at least a second transport format indication points, said first transport format and said at least a second transport format forming the set of available transport formats;
the method further comprising:
selecting, in the mobile terminal, a transport format from the set of available transport formats for a scheduled transmission;
transmitting, from the mobile terminal, the scheduled transmission using the selected transport format, wherein the scheduled transmission comprises a radio resource control (RRC) connection request; and
determining, by the mobile terminal, whether to transmit a non-access stratum (NAS) service request with the scheduled transmission comprising the RRC connection request, based on one or more of a buffer status or a link quality and the non-access stratum (NAS) service request.

3. The method of claim 1, wherein the UL grant further comprises a resource block assignment indication, and wherein the method further comprises:
identifying a set of available resource block assignments by interpreting the resource block assignment indication to refer to a first resource block assignment and to at least one further resource block assignment, said two or more resource block assignments forming a set of resource block assignment indications;
selecting a resource block assignment from the set of available resource block assignments; and
wherein the transmitting of the scheduled transmission is performed using the selected resource block assignment.

4. A method of performing uplink transmission in a wireless communications system wherein base stations are arranged to grant uplink (UL) resources to mobile terminals, the method comprising:
receiving a first UL grant comprising a first transport format indication, the first UL grant being scheduled on a first Radio Network Temporary Identifier (RNTI);
receiving at least one further UL grant, a further UL grant comprising a second transport format indication, the further UL grant being scheduled on a different further RNTI;
identifying, in the mobile terminal, a set of available transport formats for a scheduled transmission, by:
identifying a first transport format using the transport format indication in the first UL grant;
identifying at least a second transport format using the transport format indication in the at least one further UL grant;
wherein the first and second transport formats form the set of available transport formats;
the method further comprising:
selecting, in the mobile terminal, one of the first and second transport formats from the set of available transport formats for a scheduled transmission;
transmitting, from the mobile terminal, the scheduled transmission using the selected transport format, wherein the scheduled transmission comprises a radio resource control (RRC) connection request; and
determining, by the mobile terminal, whether to transmit a non-access stratum (NAS) service request with the scheduled transmission comprising the RRC connection request, based on one or both of a buffer status or a link quality.

5. The method of claim 4, further comprising determining a further RNTI as an RNTI for which a predetermined offset has been added to the first RNTI.

6. The method of claim 1, further comprising determining, in the mobile terminal, whether a core network service request is to be included in the scheduled transmission.

7. The method of claim 6, wherein the determining of whether the core network service request is to be included is performed in dependence on the selected transport format.

8. The method of claim 1, wherein:
the selecting of a transport format is performed in dependence on one or more of:
an estimate of the uplink propagation channel conditions; and
UE buffer status information.

9. A method of facilitating uplink (UL) transmission from a mobile terminal in a wireless communications system wherein base stations are arranged to grant UL resources to mobile terminals, the method comprising:
identifying, in the base station, a transport format set comprising transport formats to be available for a scheduled transmission from a mobile terminal by use of an extended transport format table, wherein the transport format indication matches a set of transport formats from the extended transport format table;
transmitting, from the base station, a UL grant comprising the transport format indication to which the identified set of transport formats is associated in the extended transport format table;
receiving, in the base station, the scheduled transmission in response to the UL grant;
decoding the scheduled transmission by blind detection using transport formats from the identified set of transport formats, wherein the scheduled transmission comprises a radio resource control (RRC) connection request; and
determining, by the mobile terminal, whether to transmit a non-access stratum (NAS) service request with the scheduled transmission comprising the RRC connection request, based on one or both of a buffer status or a link quality.

10. A method of facilitating uplink (UL) transmission from a mobile terminal in a wireless communications system wherein base stations are arranged to grant uplink resources to mobile terminals, the method comprising:
identifying, in the base station, a transport format set comprising transport formats to be available for a scheduled transmission from a mobile terminal, the identification including:
identifying a first transport format indication pointing to a first transport format;
deriving at least a second transport format indication from the first transport format indication, the second format indication pointing to a second transport format;
identifying the set of transport formats as the first and second transport formats to which the first and second transport format indications point;
transmitting, from the base station, a UL grant comprising the first transport format indication;
receiving, in the base station, a scheduled transmission in response to the UL grant;

decoding the scheduled transmission by blind detection using transport formats from the identified set of transport formats, wherein the scheduled transmission comprises a radio resource control (RRC) connection request; and determining, by the mobile terminal, whether to transmit a non-access stratum (NAS) service request with the scheduled transmission comprising the RRC connection request, based on one or both of a buffer status or a link quality.

11. A method of facilitating uplink (UL) transmission from a mobile terminal in a wireless communications system wherein base stations are arranged to grant UL resources to mobile terminals, the method comprising:

identifying, in the base station, a transport format set comprising transport formats to be available for a scheduled transmission from a mobile terminal;

identifying, in the base station, a set of different Radio Network Temporary Identifiers (RNTIs);

transmitting, from the base station on the different RNTIs, at least two UL grants, the at least two UL grants comprising different transport format indications pointing to different transport formats in the set of transport formats;

receiving, in the base station, a scheduled transmission in response to the transmission of the UL grants; and decoding the scheduled transmission by use of transport formats of the set of transport formats, wherein the scheduled transmission comprises a radio resource control (RRC) connection request; and determining, by the mobile terminal, whether to transmit a non-access stratum (NAS) service request with the scheduled transmission comprising the RRC connection request, based on one or both of a buffer status or a link quality.

12. The method of claim 11, wherein the step of identifying a set of different RNTIs comprises:

identifying a first RNTI; and determining a further RNTI as an RNTI for which a predetermined offset has been added to the first RNTI.

13. The method of claim 11, wherein the step of decoding comprises:

decoding the scheduled transmission by blind detection using transport formats from the set of transport formats.

14. The method of claim 11, wherein the at least two UL grants point to different resource blocks.

15. The method of claim 9, further comprising:

determining whether the received scheduled transmission comprises a core network service request and a radio connection request, and if so:

sending a connection request to a core network node of the wireless communications system, as well as a radio connection set-up message to the mobile terminal, in response to receipt of the scheduled transmission.

16. The method of claim 15, wherein the set of transport formats are selected in a manner so that the transport format having the strongest coding in the set corresponds to a coding which does not allow for the transmission of a combined radio connection and core network connection request message from the edge of a cell being served by the base station, but for the transmission of a separate radio connection request from said cell edge.

17. A mobile terminal for communication in a wireless communications system wherein base stations are arranged to grant uplink (UL) resources to mobile terminals, the mobile terminal comprising:

a transceiver for transmitting and receiving radio signals;

a transport format set deriving mechanism connected to the transceiver and programmably configured to identify, in response to receipt of a UL grant comprising a transport format indication, a set of transport formats available for a scheduled transmission, the set comprising at least two different transport formats from an extended transport format table matching the received transport format indication; and a scheduled transmission generating mechanism connected to the transport format set deriving mechanism and programmably configured to:

select a transport format from the set of available transport formats in response to the transport format set deriving mechanism having identified the set;

generate the scheduled transmission according to the selected transport format; and deliver the scheduled transmission to the transceiver for transmission;

wherein the scheduled transmission comprises a radio resource control (RRC) connection request; and the mobile terminal configured to:

determine, by the mobile terminal, whether to transmit a non-access stratum (NAS) service request with the scheduled transmission comprising the RRC connection request, based on one or both of a buffer status or a link quality.

18. A mobile terminal for communication in a wireless communications system wherein base stations are arranged to grant uplink (UL) resources to mobile terminals, comprising:

a transceiver for transmitting and receiving radio signals;

a transport format set deriving mechanism connected to the transceiver and programmably configured to identify, in response to receipt of a UL grant comprising a transport format indication, a set of transport formats available for a scheduled transmission, by:

identifying a transport format to which the transport format indication points;

determining at least one further transport format indication from the received transport format indication; and identifying at least one further transport format as a transport format to which the at least one further transport format indication points, said transport format and said at least one further transport format forming the set of available transport formats; and the mobile terminal further comprising:

a scheduled transmission generating mechanism connected to the transport format set deriving mechanism and programmably configured to:

select a transport format from the set of available transport formats in response to the transport format set deriving mechanism having identified the set;

generate the scheduled transmission according to the selected transport format; and deliver the scheduled transmission to the transceiver for transmission;

wherein the scheduled transmission comprises a radio resource control (RRC) connection request; and mobile terminal configured to:

determine, by the mobile terminal, whether to transmit a non-access stratum (NAS) service request with the scheduled transmission comprising the RRC connection request, based on one or both of a buffer status or a link quality.

19. A mobile terminal for communication in a wireless communications system wherein base stations are arranged to grant uplink (UL) resources to mobile terminals, the mobile terminal comprising:
a transceiver for transmitting and receiving radio signals;
a transport format set deriving mechanism connected to the transceiver and programmably configured to identify, in response to receipt of at least two UL grants having been scheduled on different Radio Network Temporary Identifiers (RNTIs), a set of transport formats available for a scheduled transmission, by extracting a respective transport format indication from each of the at least two UL grants, where the transport format indications each point to one of a plurality of transport formats and the set of available transport formats is formed of the transport formats of the plurality of transportation formats to which the extracted transport format indications point; and
a scheduled transmission generating mechanism connected to the transport format set deriving mechanism and programmably configured to:
select a transport format from the set of available transport formats in response to the transport format set deriving mechanism having identified the set;
generate the scheduled transmission according to the selected transport format; and
deliver the scheduled transmission to the transceiver for transmission;
wherein the scheduled transmission comprises a radio resource control (RRC) connection request; and the mobile terminal configured to:
determine, by the mobile terminal, whether to transmit a non-access stratum (NAS) service request with the scheduled transmission comprising the RRC connection request, based on one or both of a buffer status or a link quality.

20. A tangible non-transitory computer-readable medium encoded with a computer program for performing uplink transmission in a wireless communications system wherein base stations are arranged to grant uplink (UL) resources to mobile terminals, the computer program comprising computer program code portions which, when run on processing means of a mobile terminal, causes the mobile terminal to perform the steps comprising:
receiving, in a mobile terminal, a UL grant comprising a transport format indication;
identifying, in the mobile terminal, a set of available transport formats, the set comprising at least two different transport formats from an extended transport format table matching the received transport format indication;
selecting, in the mobile terminal, a transport format from the set of available transport formats;
transmitting, from the mobile terminal, a scheduled transmission using the selected transport format;
wherein the scheduled transmission comprises a radio resource control (RRC) connection request; and
determining, by the mobile terminal, whether to transmit a non-access stratum (NAS) service request with the scheduled transmission comprising the RRC connection request, based on one or both of a buffer status or a link quality.

21. A tangible non-transitory computer-readable medium encoded with a computer program for facilitating for uplink (UL) transmission of a mobile terminal in a wireless communications system wherein base stations are arranged to grant uplink resources to mobile terminals, the computer program comprising computer program code portions which, when run on processing means of a base station, causes the base station to perform the steps comprising:
identifying, in the base station, a transport format set comprising transport formats to be available for a scheduled transmission from a mobile terminal by use of an extended transport format table, wherein the transport format indication matches a set of transport formats from the extended transport format table;
transmitting, from the base station, a UL grant comprising the transport format indication to which the identified set of transport formats is associated in the extended transport format table;
receiving, in the base station, a scheduled transmission in response to the UL grant;
decoding the scheduled transmission by blind detection using transport formats from the identified set of transport formats, wherein the scheduled transmission comprises a radio resource control (RRC) connection request; and
determining, by the mobile terminal, whether to transmit a non-access stratum (NAS) service request with the scheduled transmission, based on one or both of a buffer status or a link quality.

22. A method of performing uplink transmission in a wireless communications system wherein base stations are arranged to grant uplink (UL) resources to mobile terminals, the method comprising:
receiving, in the mobile terminal, at least one UL grant comprising a first transport format indication, the first transport format indication pointing to a first transport format;
identifying a set of available transport formats using at least the received first transport format indication;
selecting, in the mobile terminal, a transport format from the set of available transport formats for a scheduled transmission of a radio connection request;
transmitting, from the mobile terminal, the scheduled transmission using the selected transport format, wherein the scheduled transmission comprises a radio resource control (RRC) connection request; and
determining, by the mobile terminal, whether to transmit a non-access stratum (NAS) service request with the scheduled transmission comprising the RRC connection request, based on one or both of a buffer status or a link quality.

* * * * *